(12) United States Patent
Walton et al.

(10) Patent No.: US 8,273,826 B2
(45) Date of Patent: *Sep. 25, 2012

(54) IMPACT MODIFICATION OF THERMOPLASTICS WITH ETHYLENE/α-OLEFIN INTERPOLYMERS

(75) Inventors: Kim L. Walton, Lake Jackson, TX (US); Gary R. Marchand, Lake Jackson, TX (US); Shrikant Dhodapkar, Lake Jackson, TX (US); Mridula Kapur, Lake Jackson, TX (US); Shaofu Wu, Sugar Land, TX (US)

(73) Assignee: Dow Global Technologies LLC, Midland, MI (US)

(*) Notice: Subject to any disclaimer, the term of this patent is extended or adjusted under 35 U.S.C. 154(b) by 304 days.

This patent is subject to a terminal disclaimer.

(21) Appl. No.: 12/732,950

(22) Filed: Mar. 26, 2010

(65) Prior Publication Data

US 2010/0240818 A1  Sep. 23, 2010

Related U.S. Application Data

(63) Continuation-in-part of application No. 11/376,838, filed on Mar. 15, 2006, now Pat. No. 7,863,379.

(51) Int. Cl.
| | |
|---|---|
| C08L 53/00 | (2006.01) |
| C08L 83/00 | (2006.01) |
| C08L 23/00 | (2006.01) |
| C08L 23/04 | (2006.01) |
| C08F 8/00 | (2006.01) |

(52) U.S. Cl. .......... 525/88; 525/240; 525/106; 525/191; 525/95; 526/348; 526/352

(58) Field of Classification Search .................... 525/88, 525/240, 106, 191, 95; 526/348, 352
See application file for complete search history.

(56) References Cited

U.S. PATENT DOCUMENTS

| | | | |
|---|---|---|---|
| 4,762,890 | A | 8/1988 | Strait et al. |
| 4,798,081 | A | 1/1989 | Hazlitt et al. |
| 4,927,888 | A | 5/1990 | Strait et al. |
| 4,950,541 | A | 8/1990 | Tabor et al. |
| 5,089,321 | A | 2/1992 | Chum et al. |
| 5,118,753 | A | 6/1992 | Hikasa et al. |
| 5,272,236 | A | 12/1993 | Lai et al. |
| 5,278,272 | A | 1/1994 | Lai et al. |
| 6,030,917 | A | 2/2000 | Weinberg et al. |
| 6,103,803 | A | 8/2000 | Cheung et al. |
| 6,248,540 | B1 | 6/2001 | Weinberg et al. |
| 6,268,444 | B1 | 7/2001 | Klosin et al. |
| 6,306,658 | B1 | 10/2001 | Turner et al. |
| 6,316,663 | B1 | 11/2001 | Guram et al. |
| 6,362,309 | B1 | 3/2002 | Lund et al. |
| 6,395,671 | B2 | 5/2002 | LaPointe |
| 6,838,540 | B2 * | 1/2005 | Mitani et al. ............ 526/348 |
| 2004/0010103 | A1 | 1/2004 | Boussie et al. |
| 2006/0199930 | A1 | 9/2006 | Li Pi Shan et al. |

FOREIGN PATENT DOCUMENTS

| | | | |
|---|---|---|---|
| JP | 2004-204058 | * | 12/2002 |
| WO | 9914271 | A1 | 3/1999 |
| WO | WO 01/55231 | * | 8/2001 |
| WO | 03040195 | A1 | 5/2003 |
| WO | 2004024740 | A1 | 3/2004 |
| WO | 2005090425 | A1 | 9/2005 |
| WO | 2005090426 | A1 | 9/2005 |
| WO | 2005090427 | A2 | 9/2005 |
| WO | 2006102155 | A2 | 9/2006 |
| WO | 2010029628 | A1 | 3/2010 |
| WO | 2010039628 | A2 | 4/2010 |

OTHER PUBLICATIONS

Hazlitt, J. Appl. Polym. Sci. Appl. Poly. Symp., 45, 25-37 (1990).
Randall, JMS-Rev. Macromol. Chem. Phys., C29, 201-317 (1989).
Wilde et al., J. Polym. Sci, 20, 441-455 (1982).
Williams, et al., J. Polym. Sci., Polym. Let., vol. 6, 621-624 (1968).

* cited by examiner

Primary Examiner — Vasu Jagannathan
Assistant Examiner — Irina Krylova
(74) Attorney, Agent, or Firm — Whyte Hirschboeck Dudek SC

(57) ABSTRACT

Impact modified compositions having good impact performance can be made from a thermoplastic (e.g., a polyolefin such as polypropylene or HDPE) and a multi-block ethylene/α-olefin interpolymer. The compositions are easily molded and often have particular utility in making, for example, automotive facia, parts and other household articles.

19 Claims, 16 Drawing Sheets

US 8,273,826 B2

IMPACT MODIFICATION OF THERMOPLASTICS WITH ETHYLENE/α-OLEFIN INTERPOLYMERS

CROSS-REFERENCE TO RELATED APPLICATIONS

This application is a Continuation-In-Part Application to U.S. application Ser. No. 11/376,838, filed Mar. 15, 2006 now U.S. Pat. No. 7,863,379, which claims priority to PCT Application No. PCT/US2005/008917, filed on Mar. 17, 2005, which in turn claims priority to U.S. Provisional Application No. 60/553,906, filed Mar. 17, 2004 and also claims priority to U.S. Provisional Application Ser. No. 60/717,928 filed Sep. 16, 2005, and the present application also claims the benefit of U.S. Provisional Application No. 61/163,937, filed on Mar. 27, 2009. The presented application is also related to the following U.S. Provisional Applications having Ser. Nos. 61/024,674; 61/024,688; 61/024,693; 61/024,696; 61/024,701; and 61/024,705, all filed on Jan. 30, 2008. For purposes of United States patent practice, the contents of the aforementioned applications are herein incorporated by reference to the extent that the language is not inconsistent with the instant application.

FIELD OF THE INVENTION

This invention relates to improved impact modification of thermoplastic polymers and polymer blends.

BACKGROUND AND SUMMARY OF THE INVENTION

Many different polymers and materials have been added to polymer compositions in attempting to enhance the composition's impact strength or maintain the impact strength while enhancing other properties. For example, U.S. Pat. No. 5,118,753 (Hikasa et al.), incorporated herein by reference, discloses thermoplastic elastomer compositions said to have low hardness and excellent flexibility and mechanical properties consisting essentially of a mixture of an oil-extended olefinic copolymer rubber and an olefinic plastic. The olefinic plastic is polypropylene or a copolymer of polypropylene and an .alpha.-olefin of 2 or more carbon atoms. Modern Plastics Encyclopedia/89, mid October 1988 Issue, Volume 65, Number 11, pp. 110-117, the disclosure of which is incorporated herein by reference, also discusses the use of various thermoplastic elastomers (TPEs) useful for impact modification. These include: elastomeric alloys TPEs, engineering TPEs, olefinic TPEs (also known as thermoplastic olefins or TPOs), polyurethane TPEs and styrenic TPEs.

Thermoplastic olefins (TPOs) are often produced from blends of an elastomeric material such as ethylene/propylene rubber (EPM) or ethylene/propylene diene monomer terpolymer (EPDM) and a more rigid material such as isotactic polypropylene. Other materials or components can be added into the formulation depending upon the application, including oil, fillers, and cross-linking agents. TPOs are often characterized by a balance of stiffness (modulus) and low temperature impact, good chemical resistance and broad use temperatures. Because of features such as these, TPOs are used in many applications, including automotive facia and wire and cable operations, rigid packaging, molded articles, instrument panels, and the like.

Union Carbide Chemicals and Plastics Inc. announced in 1990 that they have developed a new cost effective class of polyolefins trademarked Flexomer™ Polyolefins that could replace expensive EPM or EPDM rubbers. These new polyolefins are said to have bridged the gap between rubbers and polyethylene, having moduli between the two ranges. Modulus of the rubber and of the formulation is not, however, the only criteria for evaluating a TPO formulation. Low temperature impact performance, sometimes measured by Gardner Impact at −30° C. also is sometimes important to a TPO composition's performance. According to the data contained in FIG. 4 of the paper "Flexomer™ Polyolefins: A Bridge Between Polyethylene and Rubbers" by M. R. Rifi, H. K. Ficker and M. A. Corwin, more of the Flexomer™ Polyolefin needs to be added into the TPO formulation in order to reach the same levels of low temperature Gardner Impact performance as the standard EPM rubber, thus somewhat negating the benefits of the lower cost EPM/EPDM replacement. For example, using the data of FIG. 4 of the Rifi et al paper, about 20% (by weight) of the EPM in polypropylene gives a Gardner Impact of about 22 J. at −30.degree. C., while the same amount of Flexomer™ Polyolefin gives a −30° C. Gardner Impact of about 13 J.

In a paper presented on Sep. 24, 1991 at the 1991 Specialty Polyolefins Conference (SPO '91) (pp. 43-55) in Houston, Tex., Michael P. Jeffiies (Exxpol Ethylene Polymers Venture Manager of Exxon Chemical Company) also reports that Exxon's Exact™ polymers and Plastomers can be blended into polypropylene for impact modification. Exxon Chemical Company, in the Preprints of Polyolefins VII International Conference, page 45-66, Feb. 24-27 1991, also disclose that the narrow molecular weight distribution (NMWD) resins produced by their EXXPOL™ technology have higher melt viscosity and lower melt strength than conventional Ziegler resins at the same melt index. In another recent publication, Exxon Chemical Company has also taught that NMWD polymers made using a single site catalyst create the potential for melt fracture ("New Specialty Linear Polymers (SLP) For Power Cables," by Monica Hendewerk and Lawrence Spenadel, presented at IEEE meeting in Dallas, Tex., September, 1991).

It is well known that narrow molecular weight distribution linear polymers disadvantageously have low shear sensitivity or low $I_{10}/I_2$ value, which limits the extrudability of such polymers. Additionally, such polymers possessed low melt elasticity, causing problems in melt fabrication such as film forming processes or blow molding processes (e.g., sustaining a bubble in the blown film process, or sag in the blow molding process etc.). Finally, such resins also experienced surface melt fracture properties at relatively low extrusion rates thereby processing unacceptably and causing surface irregularities in the finished product.

Thus, while the development of new lower modulus polymers such as Flexomer™ Polyolefins by Union Carbide or Exact™ polymers by Exxon has aided the TPO marketplace, there continues to be a need for other more advanced, cost-effective polymers for compounding with thermoplastics (e.g., polyolefins such as polypropylene or HDPE) to improve or maintain modulus and/or impact performance at room temperature or below.

Formulated compositions have now been discovered to have this combination of good low temperature impact performance and modulus. In one aspect, the impact modified compositions comprise:

A) a thermoplastic polymer composition; and

B) an impact-modifying amount of a multi-block ethylene/α-olefin interpolymer comprising hard segments and soft segments, wherein the amount of the hard segments is at least 30 weight percent, based on the total weight of the multi-block ethylene/α-olefin interpolymer, and wherein the multi-block ethylene/α-olefin interpolymer:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the multi-block ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent, of that of the multi-block ethylene/α-olefin interpolymer; or (e) has at least one molecular fraction which elutes between 40° C. and 130° C. when fractionated using TREF, characterized in that the fraction has a block index of at least 0.5 and up to about 1; or (f) has an average block index greater than zero and up to about 1.0 and a molecular weight distribution, Mw/Mn, greater than about 1.3; or (g) has a storage modulus at 25° C., G'(25° C.), and a storage modulus at 100° C., G'(100° C.), wherein the ratio of G'(25° C.) to G'(100° C.) is in the range of about 1:1 to about 9:1.

In some embodiments, the amount of the hard segment in the multi-block ethylene/α-olefin interpolymer disclosed herein is from about 35 weight percent to about 80 weight percent, based on the total weight of the multi-block ethylene/α-olefin interpolymer.

In other embodiments, the amount of the α-olefin monomer in the soft segment of the multi-block ethylene/α-olefin interpolymer disclosed herein is from about 12 mole percent to about 35 mole percent, based on the total amount of the α-olefin monomer and the ethylene monomer in the soft segment in mole.

In certain embodiments, the thermoplastic polymer composition comprises one or more polymers selected from the group consisting of polyurethanes, polyvinyl chlorides, styrenics, polyolefins, polycarbonates, thermoplastic polyester, polyamides, polyacetals, and polysulfones. In other embodiments, the thermoplastic polymer composition comprises polypropylene. In further embodiments, the thermoplastic polymer composition comprises high density polyethylene.

In some embodiments, the multi-block ethylene/α-olefin interpolymer is a multi-block interpolymer. In other embodiments, the α-olefin monomer is 1-butene, 1-hexene or 1-octene. In further embodiments, the multi-block ethylene/α-olefin interpolymer has a density of from about 0.85 to about 0.93 g/cm$^3$.

In certain embodiments, the impact modified compositions disclosed herein further comprise at least one additive selected from the group consisting of slip agents, anti-blocking agents, cling additives, plasticizers, oils, waxes, antioxidants, UV stabilizers, colorants or pigments, fillers, flow aids, coupling agents, crosslinking agents, surfactants, solvents, lubricants, antifogging agents, nucleating agents, flame retardants, antistatic agents and combinations thereof.

In some embodiments, the thermoplastic polymer composition comprises at least one propylene polymer, and wherein the amount of the multi-block ethylene/α-olefin interpolymer is from about 10 weight percent to about 40 weight percent, based on the total weight of the composition. In other embodiments, the notched Izod impact strength at 20° C. is at least 5% higher, at least 10% higher or at least 15% higher as compared to the same propylene polymer composition without the multi-block ethylene/α-olefin interpolymer.

In certain embodiments, the thermoplastic polymer composition comprises at least one high density polyethylene, and wherein the amount of the multi-block ethylene/α-olefin interpolymer is from about 1 weight percent to about 40 weight percent, based on the total weight of the composition. In other embodiments, the notched Izod impact strength at 20° C. is at least 5% higher, at least 10% higher or at least 15% higher as compared to the same high density polyethylene composition without the multi-block ethylene/α-olefin interpolymer.

In one aspect, featured herein are fabricated articles made from the impact modified compositions disclosed herein.

DETAILED DESCRIPTION OF THE INVENTION

General Definitions

Figure 1:
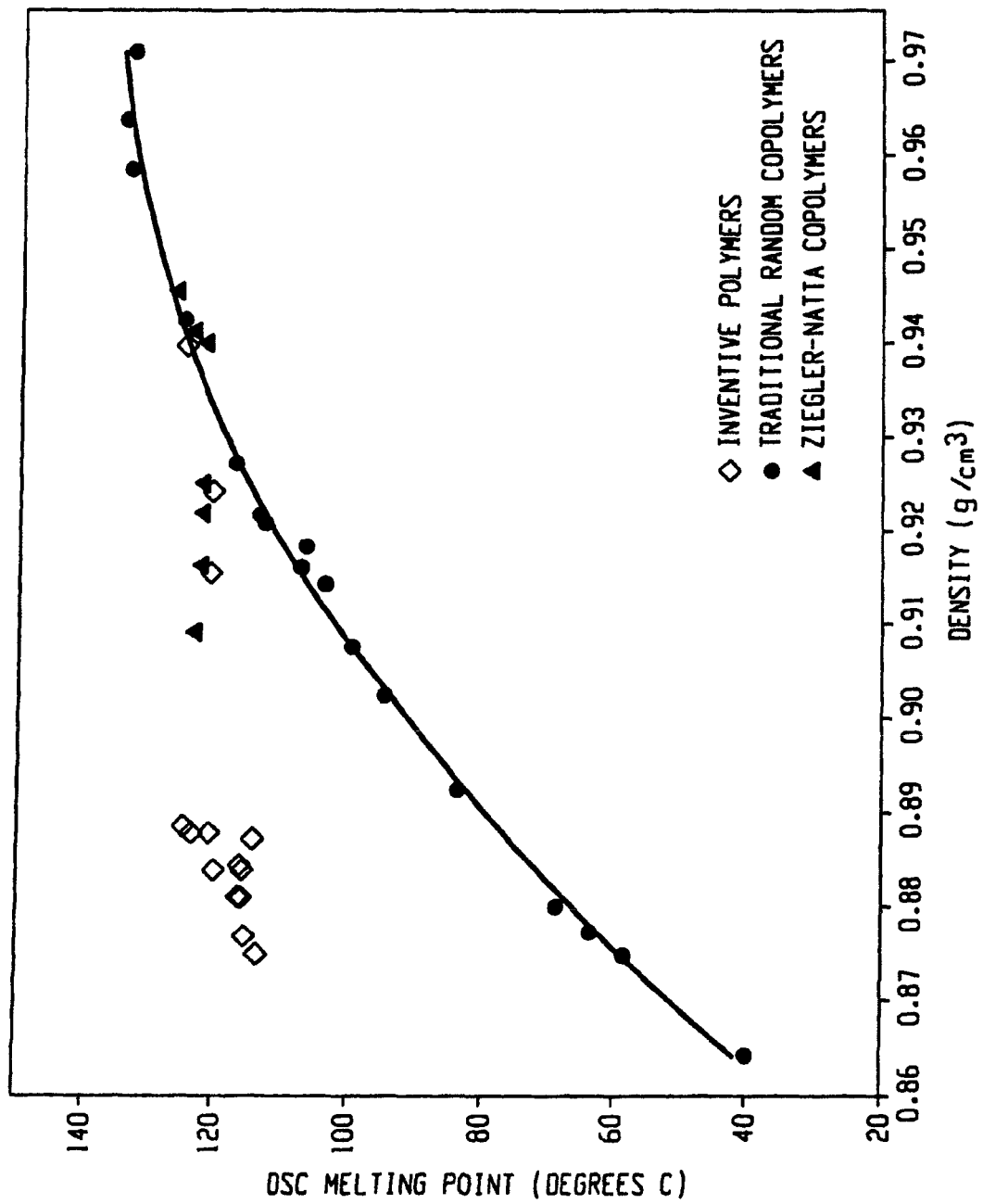
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" blocks or segments. "Hard" blocks or segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene.

"Soft" blocks or segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

In some embodiments, the α-olefin content (content of monomers other than ethylene) in the soft segments of the ethylene/α-olefin interpolymers disclosed herein is from about 5 mole percent to about 50 mole percent, from about 8 mole percent to about 45 mole percent, from about 10 mole percent to about 40 mole percent, from about 12 mole percent to about 35 mole percent, or from about 15 mole percent to about 30 mole percent, based on the total amount of the α-olefin and ethylene in the soft segments in mole.

In other embodiments, the α-olefin content (content of monomers other than ethylene) in the soft segments of the ethylene/α-olefin interpolymers disclosed herein is from about 35 weight percent to about 75 weight percent, from about 40 weight percent to about 70 weight percent, from about 45 weight percent to about 65 weight percent, from about 50 weight percent to about 60 weight percent, or from about 53 weight percent to about 58 weight percent, based on the total weight of the soft-segment polymer.

In certain embodiments, the amount of the soft segments in the multi-block ethylene/α-olefin interpolymer disclosed herein is from about 1 weight percent to about 99 weight percent, from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent, based on the total weight of the multi-block ethylene/α-olefin interpolymer.

In some embodiments, the amount of the hard segments in the multi-block ethylene/α-olefin interpolymers disclosed herein is from about 25 weight percent to about 95 weight percent, from about 25 weight percent to about 90 weight percent, from about 30 weight percent to about 80 weight percent, from about 35 weight percent to about 80 weight percent, from about 35 weight percent to about 75 weight percent, from about 35 weight percent to about 70 weight percent, from about 35 weight percent to about 65 weight percent, from about 35 weight percent to about 60 weight percent, or from about 35 weight percent to about 50 weight percent, based on the total weight of the multi-block ethylene/α-olefin interpolymer.

In other embodiments, the amount of the hard segments in the multi-block ethylene/α-olefin interpolymers disclosed herein is greater than 30 weight percent, greater than 35 weight percent, greater than 40 weight percent, greater than 45 weight percent, greater than 50 weight percent, greater than 55 weight percent, greater than 60 weight percent, greater than 65 weight percent, greater than 70 weight percent, greater than 75 weight percent, greater than 80 weight percent, greater than 85 weight percent, greater than 90 weight percent, greater than 95 weight percent, greater than 97.5 weight percent, or greater than 99 weight percent, based on the total weight of the multi-block ethylene/α-olefin interpolymer.

The soft segment weight percentage and the hard segment weight percentage can be calculated based on data obtained from DSC or NMR. Such methods and calculations are disclosed in U.S. Application Publication No. 2006/0199930, filed as U.S. patent application Ser. No. 11/376,835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

"Impact-modifying amount of ethylene/α-olefin multi-block interpolymer" is a quantity of ethylene/α-olefin multi-block interpolymer added to a given polymer composition such that the composition's notched Izod impact strength at room temperature or below is maintained or increased as compared to said given composition's notched Izod impact strength at the same temperature without the added ethylene/α-olefin multi-block interpolymer.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
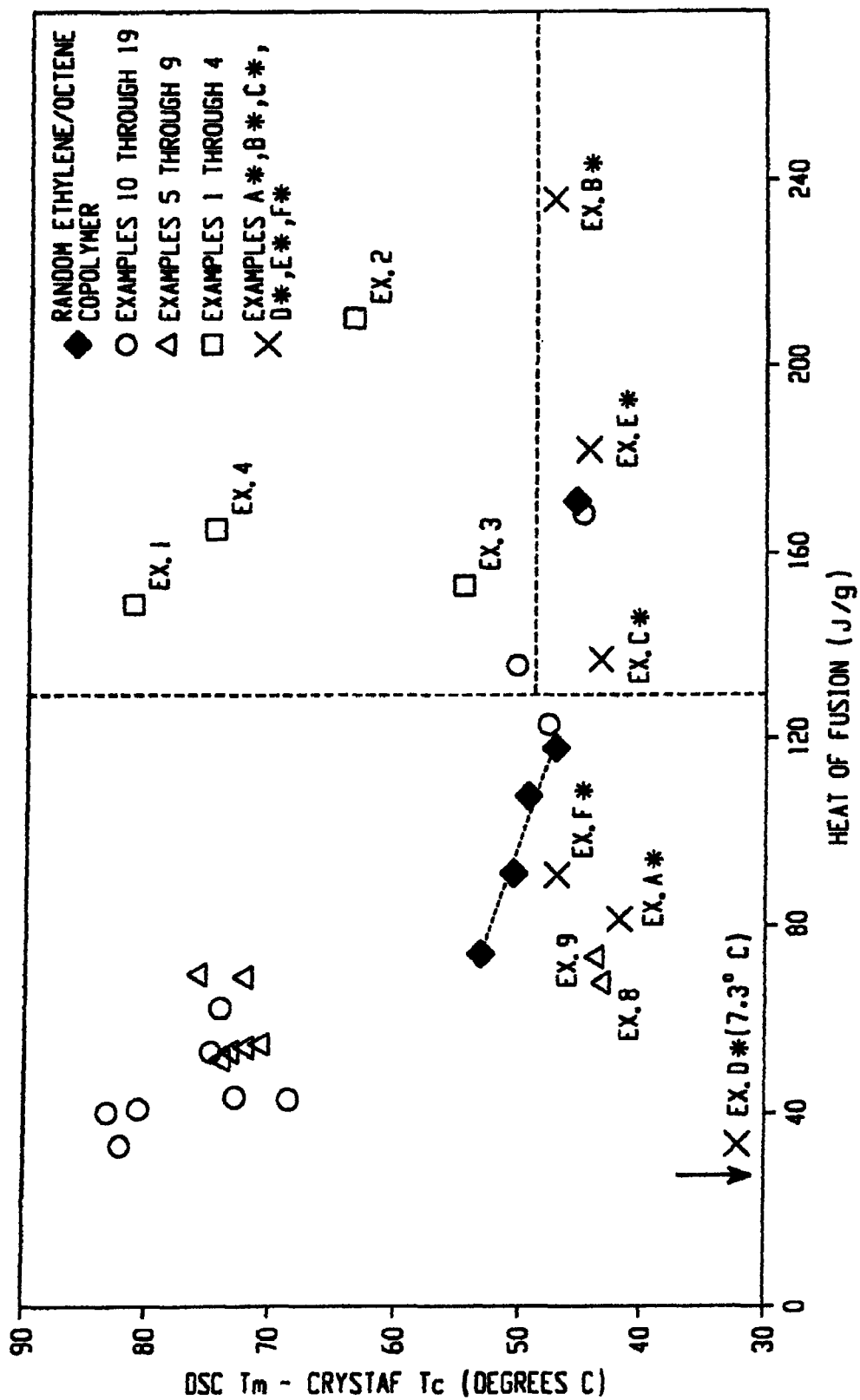
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re \geq 1491 - 1629(d); \text{ and more preferably}$$

$$Re \geq 1501 - 1629(d); \text{ and even more preferably}$$

$$Re \geq 1511 - 1629(d).$$

Figure 3:
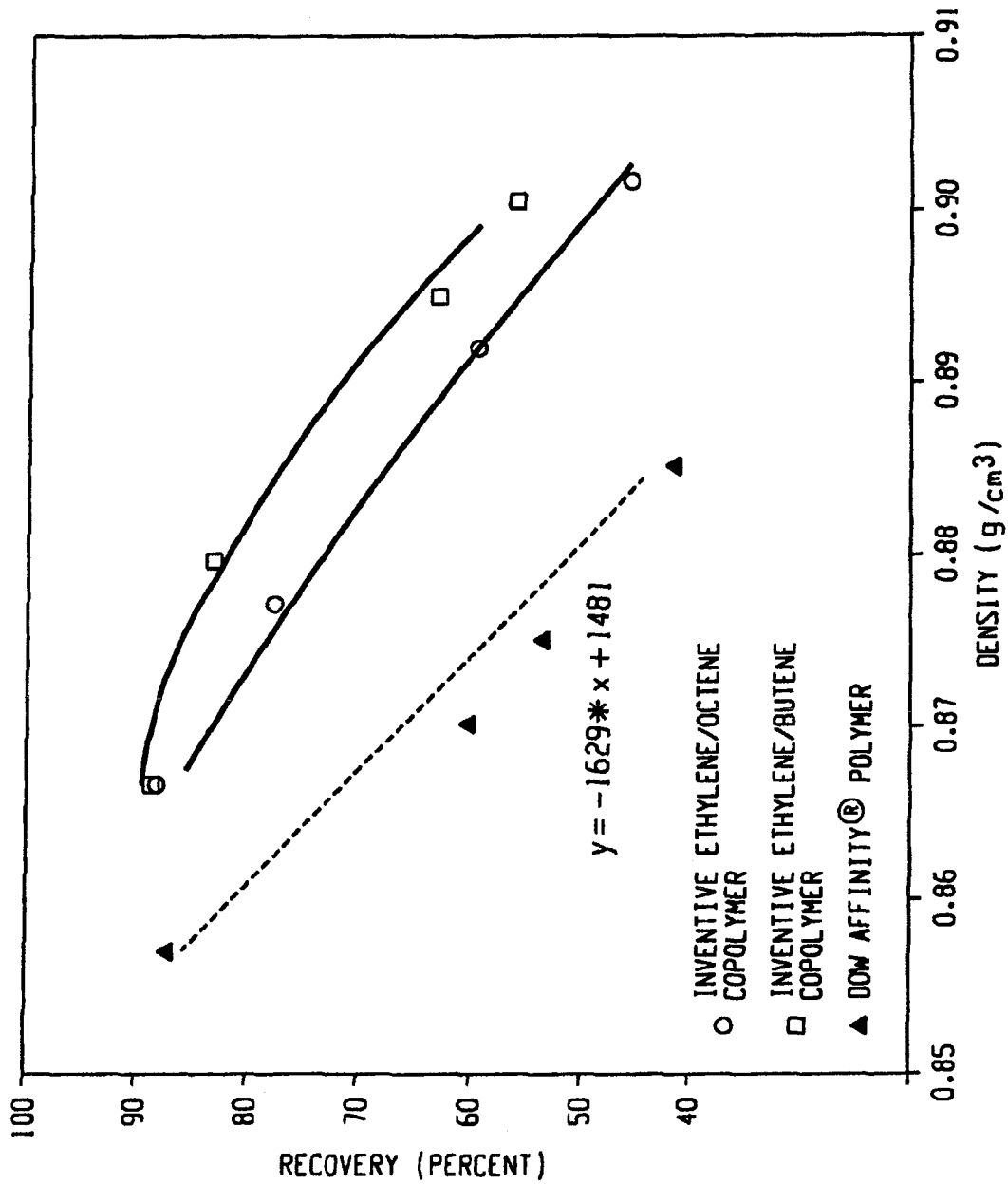
FIG. 3 shows the effect of density on elastic recovery for unoriented films made from inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength≧11 MPa, more preferably a tensile strength≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl: methylene area ratio $[CH_3/CH_2]$ of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
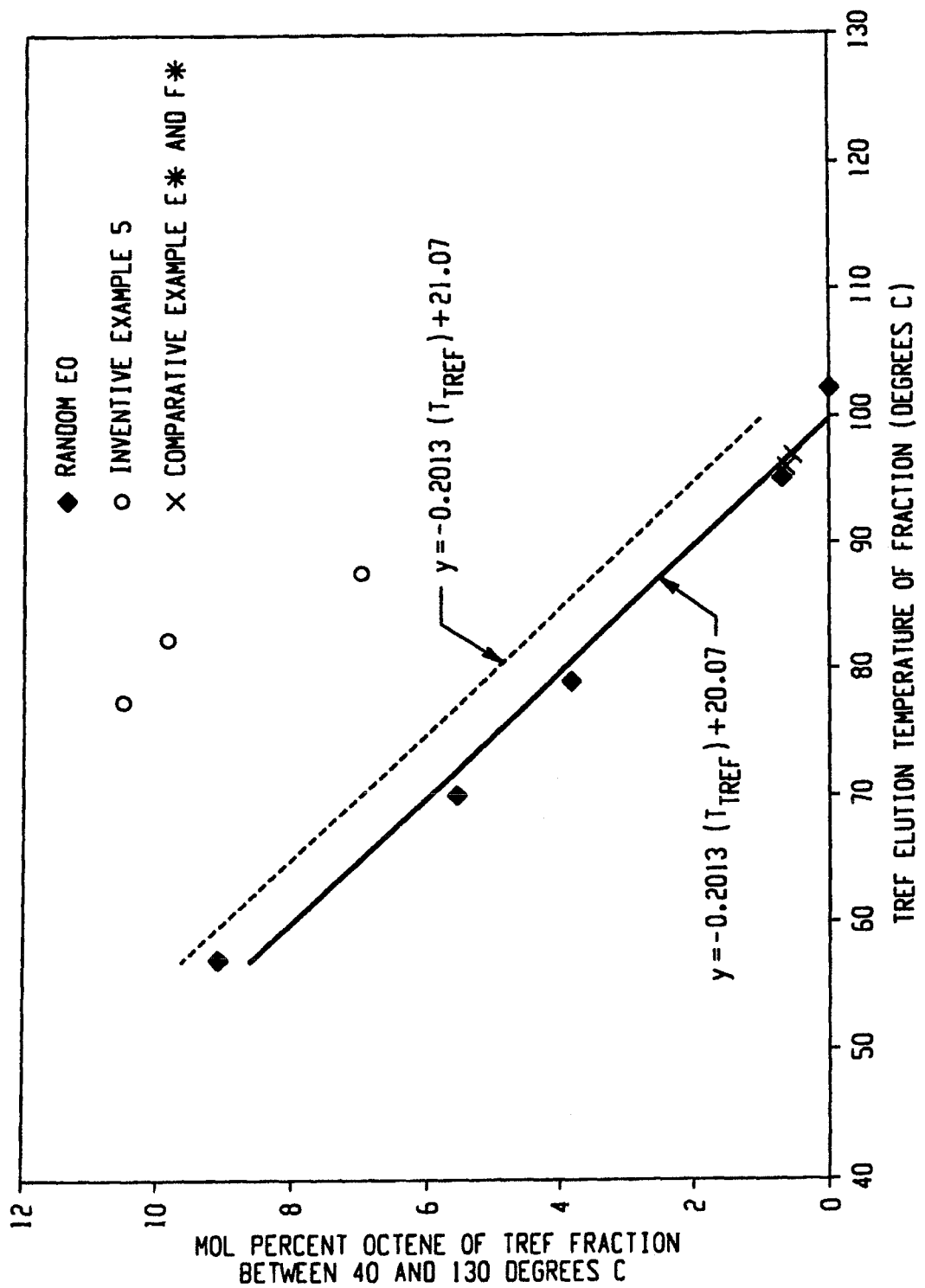
FIG. 4 is a plot of octene content of TREF fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
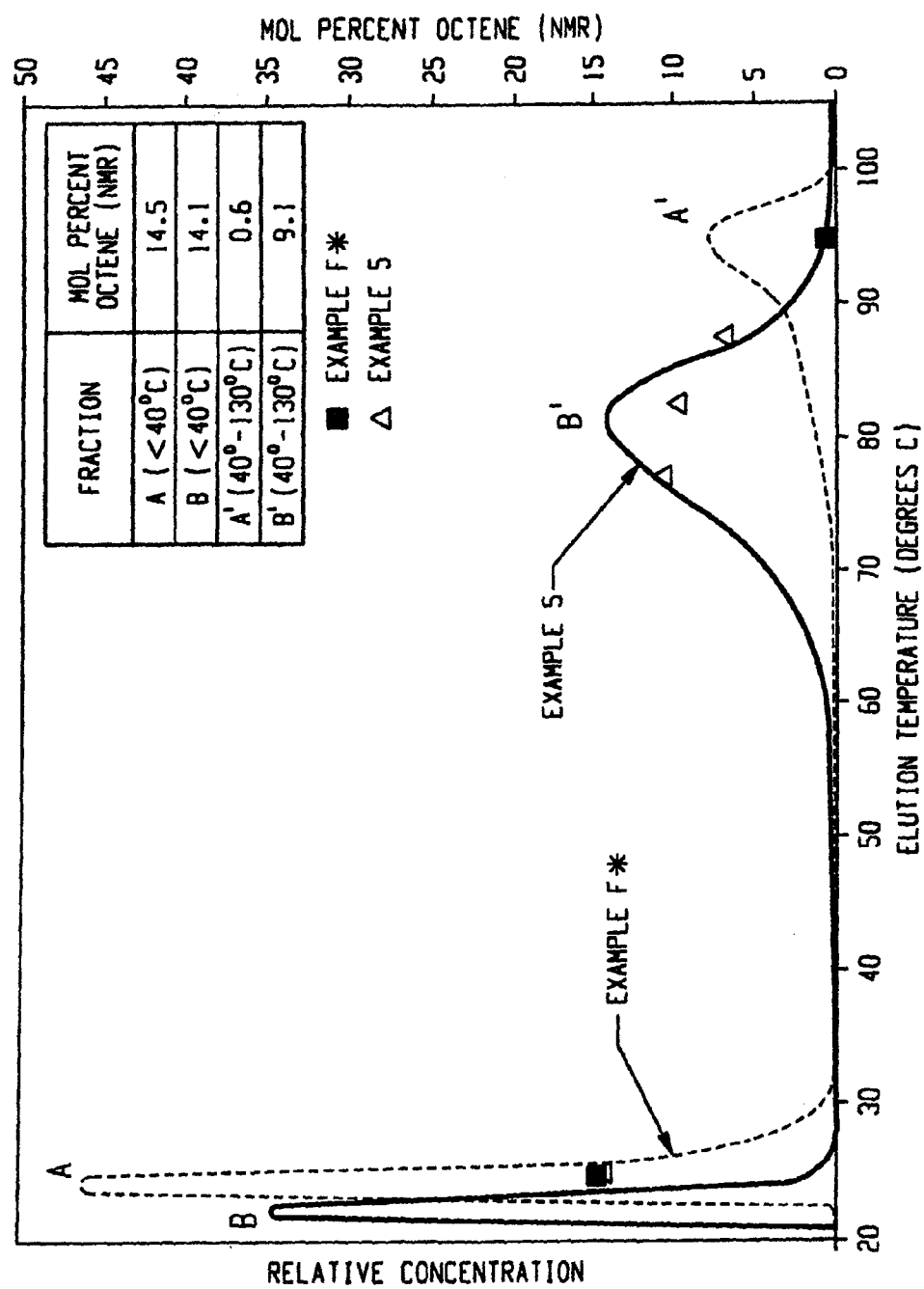
FIG. 5 is a plot of octene content of TREF fractionated ethylene/1-octene copolymer fractions versus TREF elution temperature of the fraction for the polymer of Example 5 (curve 1) and for comparative F (curve 2). The squares represent Example F*; and the triangles represent Example 5.

FIG. 5 graphically displays the TREF curve and comonomer contents of polymer fractions for Example 5 and comparative F to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm³, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013)T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction})+135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion(J/gm)} \leq (3.1718)(\text{ATREF elution temperature in Celsius})-136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion(J/gm)} \leq (1.1312)(\text{ATREF elution temperature in Celsius})+22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor (CH$_2$) and composition sensor (CH$_3$) that are fixed narrow band infra-red filters in the region of 2800-3000 cm$^{-1}$. The measurement sensor detects the methylene (CH$_2$) carbons on the polymer (which directly relates to the polymer concentration in solution) while the composition sensor detects the methyl (CH$_3$) groups of the polymer. The mathematical ratio of the composition signal (CH$_3$) divided by the measurement signal (CH$_2$) is sensitive to the comonomer content of the measured polymer in solution and its response is calibrated with known ethylene alpha-olefin copolymer standards.

The detector when used with an ATREF instrument provides both a concentration (CH$_2$) and composition (CH$_3$) signal response of the eluted polymer during the TREF process. A polymer specific calibration can be created by measuring the area ratio of the CH$_3$ to CH$_2$ for polymers with known comonomer content (preferably measured by NMR). The comonomer content of an ATREF peak of a polymer can be estimated by applying a the reference calibration of the ratio of the areas for the individual CH$_3$ and CH$_2$ response (i.e. area ratio CH$_3$/CH$_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [CH$_3$/CH$_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where BI$_i$ is the block index for the ith fraction of the inventive ethylene/α-olefin interpolymer obtained in preparative TREF, and w$_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K., $P_A$ is 1.

$T_{AB}$ is the ATREF temperature for a random copolymer of the same composition and having an ethylene mole fraction of $P_{AB}$. $T_{AB}$ can be calculated from the following equation:

$$LnP_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$LnP = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
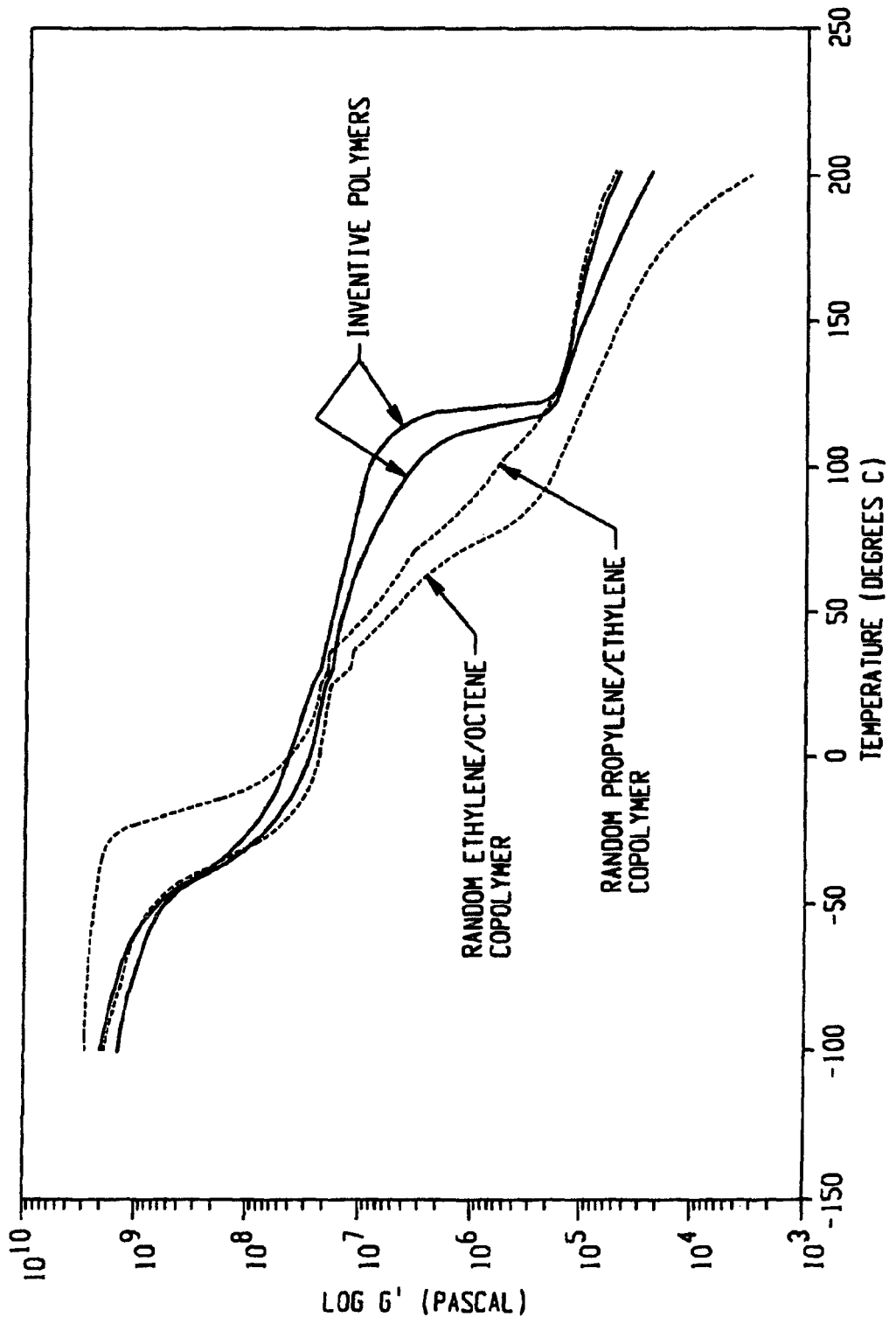
FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log(G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
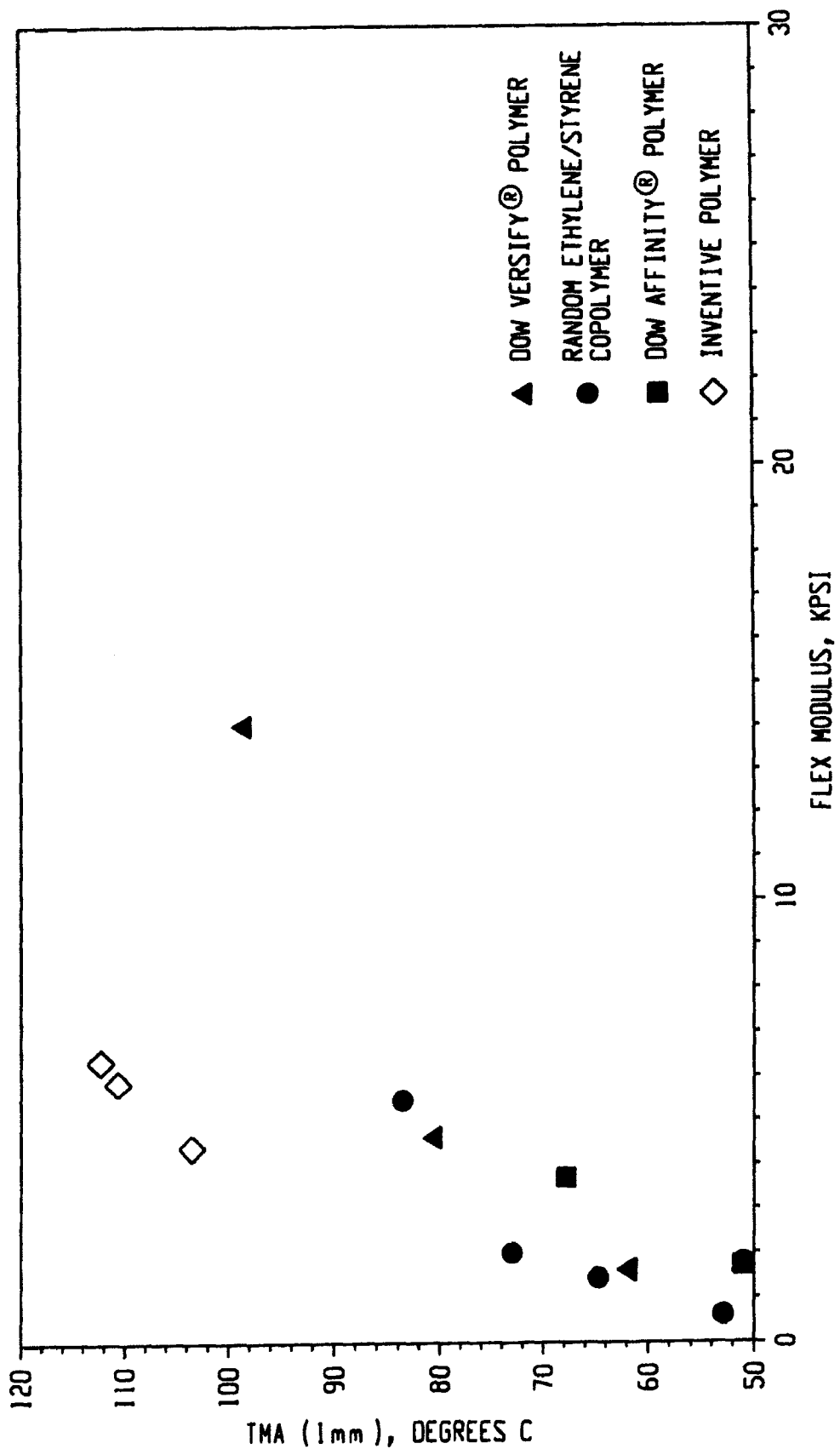
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; U.S. Provisional Application No. 61/024,674 filed Jan. 30, 2008; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

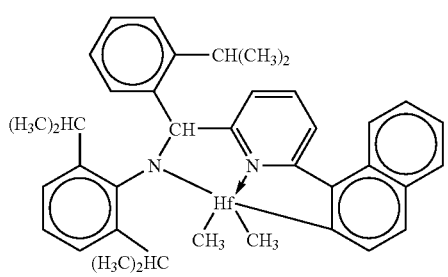

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

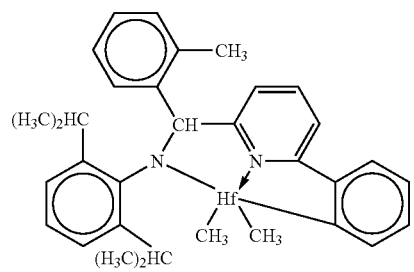

Catalyst (A3) is bis[N,N'''-(2,4,6-tri(methylphenyl)amido)ethylenediamine]hafnium dibenzyl.

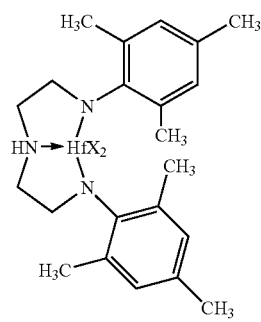

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

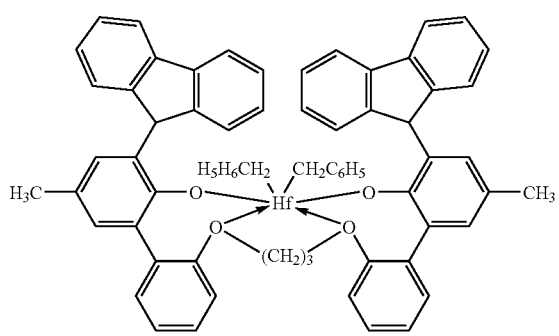

Catalyst (B1) is 1,2-bis-(3,5-di-t-butylphenylene)(1-(N-(1-methylethyl)immino)methyl)(2-oxoyl) zirconium dibenzyl

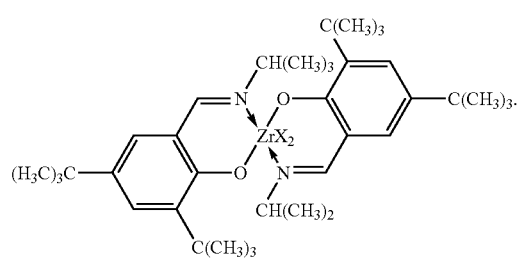

X = CH₂C₆H₅

Catalyst (B2) is 1,2-bis-(3,5-di-t-butylphenylene)(1-(N-(2-methylcyclohexyl)-immino)methyl)(2-oxoyl) zirconium dibenzyl

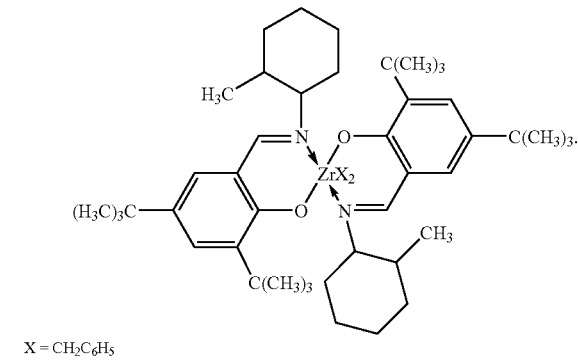

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

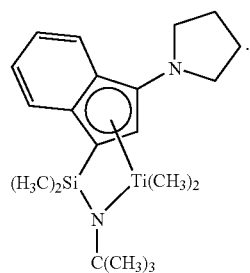

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

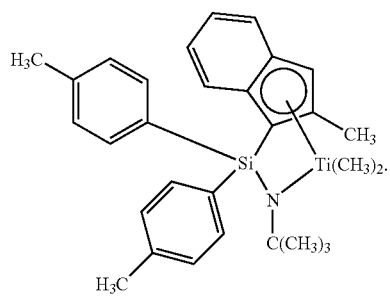

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

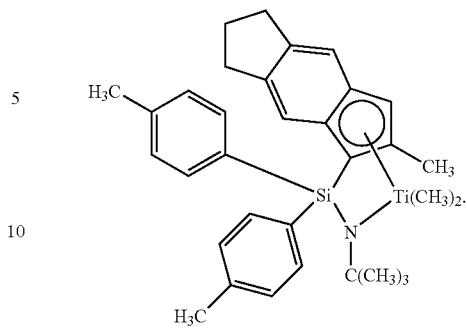

Catalyst (D1) is bis(dimethyldisiloxane)(indene-1-yl)zirconium dichloride available from Sigma-Aldrich:

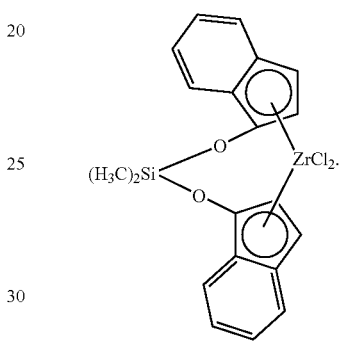

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropyl idene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2$=$CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML(1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400–600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK. Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\epsilon_f$ is the strain taken for cyclic loading and $\epsilon_s$ is the strain where the load returns to the baseline during the $1^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation ISOPAR E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methyl ethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl) zirconium dibenzyl A solution of (1-methylethyl)(2-hydroxy-3,5-di(t-butyl) phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl)immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl) zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA 11), n-octylaluminum bis(2,6-di-t-butylphenoxide) (SA12), n-octylaluminum di(ethyl(1-naphthyl)amide) (SA13), ethylaluminum bis (t-butyldimethylsiloxide) (SA14), ethylaluminum di(bis (trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(S A18), ethylzinc (2,6-diphenylphenoxide) (SA 19), and ethylzinc (t-butoxide) (SA20).

Examples 1-4, Comparative A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 µL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

TABLE 1

| Ex. | Cat. (A1) (µmol) | Cat (B1) (µmol) | Cocat (µmol) | MMAO (µmol) | shuttling agent (µmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

Examples 5-19, Comparatives D-F, Continuous Solution Polymerization, Catalyst A1/B2+DEZ Continuous solution polymerizations are carried out in a computer controlled autoclave reactor equipped with an internal stirrer. Purified mixed alkanes solvent (ISOPAR™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/[DEZ]$[4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention

[1] standard cm³/min

[2] [N-(2,6-di(1-methylethyl)phenyl)amido)(2-isopropylphenyl)(α-naphthalen-2-diyl(6-pyridin-2-diyl)methane)]hafnium dimethyl

[3] bis-(1-(2-methylcyclohexyl)ethyl)(2-oxoyl-3,5-di(t-butyl)phenyl)immino) zirconium dibenzyl

[4] molar ratio in reactor

[5] polymer production rate

[6] percent ethylene conversion in reactor

[7] efficiency, kg polymer/g M where g M = g Hf + g Zr

TABLE 3

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (°C.) | $T_c$ (°C.) | $T_{CRYSTAF}$ (°C.) | $T_m - T_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of comparative D shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests:

Comparative G* is a substantially linear ethylene/1-octene copolymer (AFFINITY®, available from The Dow Chemical Company), Comparative H* is an elastomeric, substantially linear ethylene/1-octene copolymer (AFFINITY®EG8100, available from The Dow Chemical Company), Comparative I is a substantially linear ethylene/1-octene copolymer (AFFINITY®PL1840, available from The Dow Chemical Company), Comparative J is a hydrogenated styrene/butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft$^2$ (kPa) | G' (25° C.)/ G' (100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |

TABLE 4-continued

High Temperature Mechanical Properties

| Ex. | TMA-1 mm penetration (° C.) | Pellet Blocking Strength lb/ft² (kPa) | G' (25° C.)/ G' (100° C.) | 300% Strain Recovery (80° C.) (percent) | Compression Set (70° C.) (percent) |
|---|---|---|---|---|---|
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$^3$, preferably less than about 80 mm$^3$, and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative G. Lower stress relaxation means that the polymer retains its force better in applications such as diapers and other garments where retention of elastic properties over long time periods at body temperatures is desired.

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

Additional Polymer Examples 19A-J, Continuous Solution Polymerization, Catalyst A1/B2+DEZ For Examples 19A-I Continuous solution polymerizations are carried out in a computer controlled well-mixed reactor. Purified mixed alkanes solvent (ISOPAR™ E available from Exxon Mobil, Inc.), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

For Example 19J

Continuous solution polymerizations are carried out in a computer controlled autoclave reactor equipped with an internal stirrer. Purified mixed alkanes solvent (ISOPAR™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

Process details and results are contained in Table 8. Selected polymer properties are provided in Tables 9A-C.

In Table 9B, inventive examples 19F and 19G show low immediate set of around 65-70% strain after 500% elongation.

TABLE 8

Polymerization Conditions

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19A | 55.29 | 32.03 | 323.03 | 101 | 120 | 600 | 0.25 | 200 | 0.42 | 3.0 | 0.70 |
| 19B | 53.95 | 28.96 | 325.3 | 577 | 120 | 600 | 0.25 | 200 | 0.55 | 3.0 | 0.24 |
| 19C | 55.53 | 30.97 | 324.37 | 550 | 120 | 600 | 0.216 | 200 | 0.609 | 3.0 | 0.69 |
| 19D | 54.83 | 30.58 | 326.33 | 60 | 120 | 600 | 0.22 | 200 | 0.63 | 3.0 | 1.39 |
| 19E | 54.95 | 31.73 | 326.75 | 251 | 120 | 600 | 0.21 | 200 | 0.61 | 3.0 | 1.04 |
| 19F | 50.43 | 34.80 | 330.33 | 124 | 120 | 600 | 0.20 | 200 | 0.60 | 3.0 | 0.74 |
| 19G | 50.25 | 33.08 | 325.61 | 188 | 120 | 600 | 0.19 | 200 | 0.59 | 3.0 | 0.54 |
| 19H | 50.15 | 34.87 | 318.17 | 58 | 120 | 600 | 0.21 | 200 | 0.66 | 3.0 | 0.70 |
| 19I | 55.02 | 34.02 | 323.59 | 53 | 120 | 600 | 0.44 | 200 | 0.74 | 3.0 | 1.72 |
| 19J | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | $Zn^4$ in polymer ppm | Poly Rate[5] lb/hr | Conv[6] wt % | Polymer wt % | Eff.[7] |
|---|---|---|---|---|---|---|---|---|---|
| 19A | 4500 | 0.65 | 525 | 0.33 | 248 | 83.94 | 88.0 | 17.28 | 297 |
| 19B | 4500 | 0.63 | 525 | 0.11 | 90 | 80.72 | 88.1 | 17.2 | 295 |
| 19C | 4500 | 0.61 | 525 | 0.33 | 246 | 84.13 | 88.9 | 17.16 | 293 |
| 19D | 4500 | 0.66 | 525 | 0.66 | 491 | 82.56 | 88.1 | 17.07 | 280 |
| 19E | 4500 | 0.64 | 525 | 0.49 | 368 | 84.11 | 88.4 | 17.43 | 288 |
| 19F | 4500 | 0.52 | 525 | 0.35 | 257 | 85.31 | 87.5 | 17.09 | 319 |
| 19G | 4500 | 0.51 | 525 | 0.16 | 194 | 83.72 | 87.5 | 17.34 | 333 |
| 19H | 4500 | 0.52 | 525 | 0.70 | 259 | 83.21 | 88.0 | 17.46 | 312 |
| 19I | 4500 | 0.70 | 525 | 1.65 | 600 | 86.63 | 88.0 | 17.6 | 275 |
| 19J | — | — | — | — | — | — | — | — | — |

[1] standard $cm^3$/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dimethyl
[4] ppm in final product calculated by mass balance
[5] polymer production rate
[6] weight percent ethylene conversion in reactor
[7] efficiency, kg polymer/g M where g M = g Hf + g Z

TABLE 9A

Polymer Physical Properties

| Ex. | Density (g/cc) | $I_2$ | $I_{10}$ | $I_{10}/I_2$ | Mw (g/mol) | Mn (g/mol) | Mw/Mn | Heat of Fusion (J/g) | Tm (° C.) | Tc (° C.) | $T_{CRYSTAF}$ (° C.) | Tm − $T_{CRYSTAF}$ (° C.) | CRYSTAF Peak Area (wt %) |
|---|---|---|---|---|---|---|---|---|---|---|---|---|---|
| 19A | 0.8781 | 0.9 | 6.4 | 6.9 | 123700 | 61000 | 2.0 | 56 | 119 | 97 | 46 | 73 | 40 |
| 19B | 0.8749 | 0.9 | 7.3 | 7.8 | 133000 | 44300 | 3.0 | 52 | 122 | 100 | 30 | 92 | 76 |
| 19C | 0.8753 | 5.6 | 38.5 | 6.9 | 81700 | 37300 | 2.2 | 46 | 122 | 100 | 30 | 92 | 8 |
| 19D | 0.8770 | 4.7 | 31.5 | 6.7 | 80700 | 39700 | 2.0 | 52 | 119 | 97 | 48 | 72 | 5 |
| 19E | 0.8750 | 4.9 | 33.5 | 6.8 | 81800 | 41700 | 2.0 | 49 | 121 | 97 | 36 | 84 | 12 |
| 19F | 0.8652 | 1.1 | 7.5 | 6.8 | 124900 | 60700 | 2.1 | 27 | 119 | 88 | 30 | 89 | 89 |
| 19G | 0.8649 | 0.9 | 6.4 | 7.1 | 135000 | 64800 | 2.1 | 26 | 120 | 92 | 30 | 90 | 90 |
| 19H | 0.8654 | 1.0 | 7.0 | 7.1 | 131600 | 66900 | 2.0 | 26 | 118 | 88 | — | — | — |
| 19I | 0.8774 | 11.2 | 75.2 | 6.7 | 66400 | 33700 | 2.0 | 49 | 119 | 99 | 40 | 79 | 13 |
| 19J | 0.8995 | 5.6 | 39.4 | 7.0 | 75500 | 29900 | 2.5 | 101 | 122 | 106 | — | — | — |

TABLE 9B

Polymer Physical Properties of Compression Molded Film

| Example | Density (g/cm³) | Melt Index (g/10 min) | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|---|---|
| 19A | 0.878 | 0.9 | 15 | 63 | 131 | 85 | 79 | 74 |
| 19B | 0.877 | 0.88 | 14 | 49 | 97 | 86 | 84 | 81 |
| 19F | 0.865 | 1 | — | — | 70 | — | 87 | 86 |
| 19G | 0.865 | 0.9 | — | — | 66 | — | — | 87 |
| 19H | 0.865 | 0.92 | — | 39 | — | — | 87 | — |

TABLE 9C

Average Block Index For exemplary polymers[1]

| Example | $Zn/C_2{}^2$ | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1]Additional information regarding the calculation of the block indices for various polymers is disclosed in U.S. Patent Application Publication No. 2006/0199930, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.
[2]Zn/C2 * 1000 = (Zn feed flow * Zn concentration/1000000/Mw of Zn)/(Total Ethylene feed flow * (1 − fractional ethylene conversion rate)/Mw of Ethylene) * 1000. Please note that "Zn" in "Zn/C₂ * 1000" refers to the amount of zinc in diethyl zinc ("DEZ") used in the polymerization process, and "C2" refers to the amount of ethylene used in the polymerization process.

Impact Modified Compositions

The specific ethylene/α-olefin multi-block interpolymer and the amount employed as the impact modifier will vary depending, among other variables, upon the polymer to be impact modified, the application, and the desired properties. It has been found that if improved low temperature impact is desired then an ethylene/α-olefin multi-block interpolymer prepared using relatively more chain shuttling agent may be more useful. While any amount of shuttling agent may be useful, it is often preferable to prepare the interpolymer using from about 50 to about 300 ppm chain shuttling agent. While not wishing to be bound to any particular theory it is believed that this is often results in an advantageous multi-core shell morphology as described in, for example, PCT Application No. PCT/US2005/008917, filed on Mar. 17, 2005, which claims priority to U.S. Provisional Application No. 60/553, 906, filed Mar. 17, 2004. For purposes of United States patent practice, the contents of said provisional and PCT application are herein incorporated by reference in their entirety.

It has also been found that to a certain extent the toughening efficiency (the amount of improvement expected from a minimal amount of impact modifier) is improved as the density of the ethylene/α-olefin multi-block interpolymer is decreased. For this reason it is often desirable to employ an interpolymer with a density of from about 0.85 to about 0.93 g/cc.

The amount of ethylene/α-olefin multi-block interpolymer employed will vary depending, among other variables, upon the polymer to be impact modified, the application, and the desired properties. Typically, an impact-modifying amount is employed to maintain or increase the notched Izod impact strength at 20° C. at least about 5%, preferably at least about 10%, more preferably at least about 15% over a similar composition lacking ethylene/α-olefin multi-block interpolymer. If one also desires low temperature impact properties then one may employ an amount sufficient to maintain or increase the notched Izod impact strength at −20° C. at least about 5%, preferably at least about 10%, more preferably at least about 15% over a similar composition lacking ethylene/α-olefin multi-block interpolymer. This amount may be the same or different than the amount employed to maintain or increase the notched Izod impact strength at 20° C.

The amounts of ingredients employed will differ depending, among other things, on the desired properties and application. Often, the weight ratio of multi-block copolymer to polyolefin may be from about 49:51 to about 5:95, more preferably from 35:65 to about 10:90. Preferably, it is desirable to employ at least about 1, preferably at least about 5, more preferably at least about 10, even more preferably at least about 20 weight percent of the ethylene/α-olefin multi-block interpolymer or blend as an impact modifier. Similarly, it is desirable to employ no more than about 50, preferably no more than about 35, more preferably no more than about 25 weight percent of the ethylene/α-olefin multi-block interpolymer or blend as an impact modifier.

In some embodiments, the amount of the multi-block ethylene/α-olefin interpolymer is from about 10 weight percent to about 40 weight percent, from about 15 weight percent to about 35 weight percent, from about 20 weight percent to about 30 weight percent, based on the total weight of the impact-modified composition.

Polymer Compositions which May be Impact Modified

Almost any thermoplastic polymer composition may be beneficially impact modified by the addition of one or more of the ethylene/α-olefin multi-block interpolymers discussed above. Such polymer compositions comprise thermoplastic polyurethanes (e.g., Pellathane™ or Isoplast™ made by The Dow Chemical Company), polyvinyl chlorides (PVCs), styrenics, hydrogenated styrenics, polynorbonene, polyethylene-co-norbornene, poly-4-methyl-pentene including poly-4-methyl-pentene pre-grafted with one or more functional monomers for compatibility, polyolefins (including, e.g., ethylene carbon monoxide copolymers (ECO) or linear alternating ECO copolymers such as those disclosed by U.S. Ser. No. 08/009,198, filed Jan. 22, 1993 (now abandoned) in the names of John G. Hefner and Brian W. S. Kolthammer, entitled "Improved Catalysts For The Preparation of Linear Carbon Monoxide/Alpha Olefin Copolymers," the disclosure of which is incorporated herein by reference, and ethylene/propylene carbon monoxide polymers (EPCO)), various engineering thermoplastics (e.g., polycarbonate, thermoplastic polyester, polyamides (e.g., nylon), polyacetals, or polysulfones), and mixtures thereof. Generally, the polyolefin polymers which may be most frequently used are polyethylene (e.g., high density polyethylene, such as that produced by the slurry or gas phase polymerization processes) or polypropylene or propylene based polymers.

The properties of the high density polyethylene (HDPE) useful in the present invention vary depending upon the desired application. Typically, useful HDPE has a density of greater than 0.94 g/cm$^3$. Preferably the density is greater than 0.95 g/cm$^3$ but less than about 0.97 g/cm$^3$. The HDPE may be produced by any process including Cr and Ziegler-Natta catalyst processes. The molecular weight of the HDPE for use in the present invention varies depending upon the application but may be conveniently indicated using a melt flow measurement according to ASTM D-1238-03 Condition 190° C./2.16 kg and Condition 190° C./5.0 kg, which are known as $I_2$ and $I_5$, respectively. Melt flow determinations can also be performed with even higher weights, such as in accordance with ASTM D-1238, Condition 190° C./10.0 kg and Condition 190° C./21.6 kg, and are known as $I_{10}$ and $I_{21}$, respectively. Melt flow rate is used for propylene based polymers and is inversely proportional to the molecular weight of the polymer. Melt flow rate (MFR) is tested in accordance with ASTM D 1238, Condition 230 C/2.16 kg (formerly Condition L). Thus, the higher the molecular weight, the lower the melt flow rate, although the relationship is not linear. The lower limits for melt index ($I_2$) for the HDPE useful herein varies widely depending upon the application, e.g., blow molding or injection molding, etc. but is generally at least about 0.1 grams/10 minutes (g/10 min), preferably about 0.5 g/10 min, especially about 1 g/10 min to a high melt index limit of about 80 g/10 min, preferably to about 25 g/10 min, and especially to about 20 g/10 min. The molecular weight of the HDPE for use in the present invention, especially for pipe applications, varies depending upon the application and can also be indicated using a melt flow measurement according to ASTM D-1238, Condition 190 C/5 kg (and also known as $I_5$). The lower limits for melt index ($I_5$) for the HDPE useful herein is generally about 0.1 grams/10 minutes (g/10 min), preferably about 0.2 g/10 min, to a high melt index limit of about 0.6 g/10 min.

Molecular weight distribution (Mw/Mn) of the selected HDPE can be narrow or broad, e.g., Mw/Mn from about 2 to as high as about 40.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5-7% ethylene copolymerized with the propylene), however, can also be used in the TPO formulations disclosed herein. A complete discussion of various polypropylene polymers is contained in Modern Plastics Encyclopedia/89, mid October 1988 Issue, Volume 65, Number 11, pp. 86-92, the entire disclosure of which is incorporated herein by reference. The molecular weight and hence the melt flow rate of the polypropylene for use in the present invention varies depending upon the application. The melt flow rate for the polypropylene useful herein is generally from about 0.1 grams/10 minutes (g/10 min) to about 100 g/10 min, preferably from about 0.5 g/10 min to about 80 g/10 min, and especially from about 4 g/10 min to about 70 g/10 min. The propylene polymer can be a polypropylene homopolymer, or it can be a random copolymer or even an impact copolymer (which already contains a rubber phase). Examples of such propylene polymers include VISTAMAX (made by Exxon Mobil), VERSIFY and INSPIRE (made by The Dow Chemical Co.), and PROFAX (made by Lyondell).

Methods for Making Blended Compositions

The blended compositions of the present invention are made by any convenient method, including dry blending the individual components and subsequently melt mixing, either directly in the extruder used to make the finished article (e.g., the automotive part), or by pre-melt mixing in a separate extruder (e.g., a Banbury mixer). Typically, the blends are prepared by mixing or kneading the respective components at a temperature around or above the melt point temperature of one or both of the components. For most multiblock copolymers, this temperature may be above 130° C., most generally above 145° C., and most preferably above 150° C. Typical polymer mixing or kneading equipment that is capable of reaching the desired temperatures and melt plastifying the mixture may be employed. These include mills, kneaders, extruders (both single screw and twin-screw), Banbury mixers, and the like. The sequence of mixing and method may depend on the final composition. A combination of Banbury batch mixers and continuous mixers may also be employed, such as a Banbury mixer followed by a mill mixer followed by an extruder.

Molding Operations

There are many types of molding operations which can be used to form useful fabricated articles or parts from the TPO formulations disclosed herein, including various injection molding processes (e.g., that described in Modern Plastics Encyclopedia/89, Mid October 1988 Issue, Volume 65, Number 11, pp. 264-268, "Introduction to Injection Molding" and on pp. 270-271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217-218, "Extrusion-Blow Molding", the disclosure of which is incorporated herein by reference), profile extrusion, sheet extrusion, and thermoforming. Some of the fabricated articles include fuel tanks, outdoor furniture, pipes, automotive container applications, automotive bumpers, facia, wheel covers and grilles, as well as other household and personal articles, including, for example, freezer containers. Of course, one skilled in the art can also combine polymers to advantageously use refractive index to improve, or maintain clarity of end use articles, such as freezer containers.

Additives

Additives such as antioxidants (e.g., hindered phenolics (e.g., Irganox™ 1010), phosphites (e.g., Irgafos™ 168)), cling additives (e.g., PM), antiblock additives, pigments, fillers (e.g., talc, diatomaceous earth, nano-fillers, clay, metal particles, glass fibers or particles, carbon black, other reinforcing fibers, etc.), and the like can also be included in the TPO formulations, to the extent that they do not interfere with the enhanced formulation properties discovered by Applicants.

Optionally, the impact modified compositions disclosed herein may independently comprise or be substantially free of at least one additive. Some non-limiting example of suitable additives include slip agents, anti-blocking agents, cling additives, plasticizers, oils, waxes, antioxidants, UV stabilizers, colorants or pigments, fillers, flow aids, coupling agents, crosslinking agents, surfactants, solvents, lubricants, antifogging agents, nucleating agents, flame retardants, antistatic agents and combinations thereof. The total amount of the additives can range from about greater than 0 to about 50 wt. %, from about 0.001 wt. % to about 40 wt. %, from about 0.01 wt. % to about 30 wt. %, from about 0.1 wt. % to about 20 wt. %, from about 0.5 wt. % to about 10 wt. %, or from about 1 wt. % to about 5 wt. % of the total weight of the impact modified composition. Some polymer additives have been described in Zweifel Hans et al., *"Plastics Additives Handbook,"* Hanser Gardner Publications, Cincinnati, Ohio, 5th edition (2001), which is incorporated herein by reference in its entirety. In some embodiments, the impact modified compositions disclosed herein do not comprise an additive such as those disclosed herein.

In some embodiments, the impact modified compositions disclosed herein optionally comprise a slip agent. Slip is the sliding of film surfaces over each other or over some other substrates. The slip performance of films can be measured by ASTM D 1894, *Static and Kinetic Coefficients of Friction of Plastic Film and Sheeting*, which is incorporated herein by reference. In general, the slip agent can convey slip properties by modifying the surface properties of articles such as films; and reducing the friction between layers of the films and between the films and other surfaces with which they come into contact.

Any slip agent known to a person of ordinary skill in the art may be added to at least an outer layer of the fabricated articles disclosed herein. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof.

Optionally, the impact modified compositions disclosed herein can comprise an anti-blocking agent. The anti-blocking agent can be used to prevent the undesirable adhesion between touching surface of the fabricated articles disclosed herein, particularly under moderate pressure and heat during storage, manufacture or use. Any anti-blocking agent known to a person of ordinary skill in the art may be added to the impact modified compositions disclosed herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the impact modified compositions disclosed herein can be from about greater than 0 to about 3 wt. %, from about 0.0001 to about 2 wt. %, from about 0.001 to about 1 wt. %, or from about 0.001 to about 0.5 wt. % of the total weight of the impact modified composition. Some anti-blocking agents have been described in Zweifel Hans et al., *"Plastics Additives Handbook,"* Hanser Gardner Publications, Cincinnati, Ohio, 5th edition, Chapter 7, pages 585-600 (2001), which is incorporated herein by reference.

Optionally, the impact modified compositions disclosed herein can comprise a plasticizer. In general, a plasticizer is a chemical that can increase the flexibility and lower the glass transition temperature of polymers. Any plasticizer known to a person of ordinary skill in the art may be added to the impact modified compositions disclosed herein. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof. Where used, the amount of the plasticizer in the impact modified compositions disclosed herein can be from greater than 0 to about 15 wt. %, from about 0.5 wt. % to about 10 wt. %, or from about 1 wt. % to about 5 wt. % of the total weight of the impact modified composition. Some plasticizers have been described in George Wypych, *"Handbook of Plasticizers,"* ChemTec Publishing, Toronto-Scarborough, Ontario (2004), which is incorporated herein by reference.

In some embodiments, the impact modified compositions disclosed herein optionally comprise an antioxidant that can prevent the oxidation of polymer components and organic additives in the impact modified composition. Any antioxidant known to a person of ordinary skill in the art may be added to the impact modified compositions disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis [(methylene(3,5-di-t-butyl-4-hydroxyhydrocinnamate)] methane (e.g., IRGANOX™ 1010, from Ciba Geigy, N.Y.); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the impact modified composition can be from about greater than 0 to about 5 wt. %, from about 0.0001 wt. % to about 2.5 wt. %, from about 0.001 wt. % to about 1 wt. %, or from about 0.001 wt. % to about 0.5 wt. % of the total weight of the impact modified composition. Some antioxidants have been described in Zweifel Hans et al., "*Plastics Additives Handbook,*" Hanser Gardner Publications, Cincinnati, Ohio, 5th edition, Chapter 1, pages 1-140 (2001), which is incorporated herein by reference.

In other embodiments, the impact modified compositions disclosed herein optionally comprise an UV stabilizer that may prevent or reduce the degradation of the impact modified composition by UV radiations. Any UV stabilizer known to a person of ordinary skill in the art may be added to the impact modified compositions disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the impact modified composition can be from about greater than 0 to about 5 wt. %, from about 0.01 wt. % to about 3 wt. %, from about 0.1 wt. % to about 2 wt. %, or from about 0.1 wt. % to about 1 wt. % of the total weight of the impact modified composition. Some UV stabilizers have been described in Zweifel Hans et al., "*Plastics Additives Handbook,*" Hanser Gardner Publications, Cincinnati, Ohio, 5th edition, Chapter 2, pages 141-426 (2001), which is incorporated herein by reference.

In further embodiments, the impact modified compositions disclosed herein optionally comprise a colorant or pigment that can change the look of the impact modified compositions to human eyes. Any colorant or pigment known to a person of ordinary skill in the art may be added to the impact modified compositions disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the impact modified composition can be from about greater than 0 to about 10 wt. %, from about 0.1 wt. % to about 5 wt. %, or from about 0.25 wt. % to about 2 wt. % of the total weight of the impact modified composition. Some colorants have been described in Zweifel Hans et al., "*Plastics Additives Handbook,*" Hanser Gardner Publications, Cincinnati, Ohio, 5th edition, Chapter 15, pages 813-882 (2001), which is incorporated herein by reference.

Optionally, the impact modified compositions disclosed herein can comprise a filler which can be used to adjust, inter alia, volume, weight, costs, and/or technical performance. Any filler known to a person of ordinary skill in the art may be added to the impact modified compositions disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, carbon black, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof.

In other embodiments, the filler is talc, calcium carbonate, barium sulfate, glass fiber or a mixture thereof. Where used, the amount of the filler in the impact modified composition can be from about greater than 0 to about 50 wt. %, from about 0.01 wt. % to about 40 wt. %, from about 0.1 wt. % to about 30 wt. %, from about 0.5 wt. % to about 20 wt. %, or from about 1 wt. % to about 10 wt. % of the total weight of the impact modified composition. Some fillers have been disclosed in U.S. Pat. No. 6,103,803 and Zweifel Hans et al., "*Plastics Additives Handbook,*" Hanser Gardner Publications, Cincinnati, Ohio, 5th edition, Chapter 17, pages 901-948 (2001), both of which are incorporated herein by reference.

Optionally, the impact modified compositions disclosed herein can comprise a lubricant. In general, the lubricant can be used, inter alia, to modify the rheology of the molten oriented film, to improve the surface finish of molded articles, and/or to facilitate the dispersion of fillers or pigments. Any lubricant known to a person of ordinary skill in the art may be added to the impact modified compositions disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the impact modified composition can be from about greater than 0 to about 5 wt. %, from about 0.1 wt. % to about 4 wt. %, or from about 0.1 wt. % to about 3 wt. % of the total weight of the impact modified composition. Some suitable lubricants have been disclosed in Zweifel Hans et al., "*Plastics Additives Handbook,*" Hanser Gardner Publications, Cincinnati, Ohio, 5th edition, Chapter 5, pages 511-552 (2001), both of which are incorporated herein by reference.

Optionally, the impact modified compositions disclosed herein can comprise an antistatic agent. Generally, the antistatic agent can increase the conductivity of the fabricated articles disclosed herein and to prevent static charge accumulation. Any antistatic agent known to a person of ordinary skill in the art may be added to the impact modified compositions disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the impact modified compositions disclosed herein can be from about greater than 0 to about 5 wt. %, from about 0.01 wt. % to about 3 wt. %, or from about 0.1 wt. % to about 2 wt. % of the total weight of the impact modified composition. Some suitable antistatic agents have been disclosed in Zweifel Hans et al., "*Plastics Additives Handbook,*" Hanser Gardner Publications, Cincinnati, Ohio, 5th edition, Chapter 10, pages 627-646 (2001), both of which are incorporated herein by reference.

In further embodiments, the impact modified compositions disclosed herein optionally comprise a cross-linking agent that can be used to increase the cross-linking density of the impact modified composition. Any cross-linking agent known to a person of ordinary skill in the art may be added to the impact modified compositions disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane). Where used, the amount of the cross-linking agent in the impact modified compositions disclosed herein can be from about greater than 0 to about 20 wt. %, from about 0.1 wt. % to about 15 wt. %, or from about 1 wt. % to about 10 wt. % of the total weight of the impact modified compositions. Some suitable cross-linking agents have been disclosed in Zweifel Hans et al., "*Plastics Additives Handbook,*" Hanser Gardner Publications, Cincinnati, Ohio, 5th edition, Chapter 14, pages 725-812 (2001), both of which are incorporated herein by reference.

In certain embodiments, the impact modified compositions disclosed herein optionally comprise a wax, such as a petroleum wax, a low molecular weight polyethylene or polypropylene, a synthetic wax, a polyolefin wax, a beeswax, a vegetable wax, a soy wax, a palm wax, a candle wax or an ethylene/α-olefin interpolymer having a melting point of greater than 25° C. In certain embodiments, the wax is a low molecular weight polyethylene or polypropylene having a number average molecular weight of about 400 to about 6,000 g/mole. The wax can be present in the range from about 0 wt. % to about 50 wt. % or from about 1 wt. % to about 40 wt. % of the total weight of the impact modified compositions.

Improved Impact Strength

The compositions of the present invention have improved impact strength.

Impact strength can be measured using, for example, Notched Izod impact testing. Notched Izod Impact is a single point test that measures a materials resistance to impact from a swinging pendulum. Izod impact is defined as the kinetic energy needed to initiate fracture and continue the fracture until the specimen is broken. Izod specimens are notched to prevent deformation of the specimen upon impact. The testing is conducted according to ASTM D56. Typically, compositions of this invention maintain or increase the notched Izod impact strength at 20° C. at least about 5%, preferably at least about 10%, more preferably at least about 15% over a similar composition lacking ethylene/α-olefin multi-block interpolymer. In addition, compositions of this invention often maintain or increase the notched Izod impact strength at −20° C. at least about 5%, preferably at least about 10%, more preferably at least about 15% over a similar composition lacking ethylene/α-olefin multi-block interpolymer. These novel impact compositions also have improved ductile-brittle transition temperature—that is, the transition from ductile to brittle failure occurs at lower temperatures, typically at least about 5 C, preferably 10 C, and more preferably at least 15 C lower than the polymer that was impact modified, and lower than an impact modified composition using a random ethylene/alpha-olefin copolymer (at about the same density and melt index as the multi-block) as the impact modifier.

EXAMPLES AND COMPARATIVE EXAMPLES OF THE PRESENT INVENTION

Blend Preparation

A series of high density polyethylene (Component 1)+impact modifying polymer (Component 2) blends are prepared by melting blending various concentrations of the two components. Prior to processing the blends a powdered antioxidant package is added to a physical mixture of the two components in a sealed bag. The package consists of 200 ppm IRGNOX 1010 and 400 ppm IRGAFOS 168. The physical polymer blend is tumbled to disperse the antioxidant throughout the resin sample. Each physical blend is purged with nitrogen to help remove any residual oxygen from the bag.

The physical polymer blend+additive package combination is processed on a Haake system supplied with a Leistritz 18 mm twin screw extruder (L/D=30), a K-TRON K2VT20 twin screw auger feeder equipped with long pitch powder screws, two refrigerated water circulation bath quench tanks, and a Berlyn PELL-2 4 blade strand chopper. A water circulator is attached to the jacket of the feed throat of the extruder and set at 20° C. to keep the polymer from melting and bridging the feed throat. The extruder temperature zones are set at 150, 180, 200, 215, and 215° C. The extruder die is set at 215° C. Prior to extrusion a lid supplied with a nitrogen line is placed on top of the feed hopper. The transition area from the feeder discharge to the extruder feed throat cone is sealed with heavy aluminum foil. The extruder is preheated, calibrated, and run empty with nitrogen flowing throughout the system to purge it of oxygen.

The physical polymer/antioxidant blend is placed in the extruder feed hopper with the nitrogen supplied lid in place. The physical blend is fed to the extruder, melt blended and extruded. The extrudate is passed through the two quench tanks to solidify the melt into a polymer strand. The strand is passed through an air knife to remove water, and subsequently chopped into pellets by the Berlyn strand chopper. The pellets are collected from the discharge chute into a labeled bag.

Test Methods

Density

Resin density was measured by the Archimedes displacement method, ASTM D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch".

Melt Flow Rate by Extrusion Plastomer

Melt flow rate measurements were performed according to ASTM D-1238-03, Condition 190° C./2.16 kg and Condition 190° C./5.0 kg, which are known as $I_2$ and $I_5$, respectively. Melt flow rate is inversely proportional to the molecular weight of the polymer. Thus, the higher the molecular weight, the lower the melt flow rate, although the relationship is not linear. Melt flow rate determinations can also be performed with even higher weights, such as in accordance with ASTM D-1238, Condition 190° C./10.0 kg and Condition 190° C./21.6 kg, and are known as $I_{10}$ and $I_{21}$, respectively. Flow Rate Ratio (FRR) is the ratio of melt flow rate ($I_{21}$) to melt flow rate ($I_2$) unless otherwise specified. For example, in some instances the FRR may be expressed as $I_{21}/I_5$, especially for higher molecular weight polymers.

Differential Scanning Calorimetry (DSC)

All of the results reported here were generated via a TA Instruments Model Q1000 DSC equipped with an RCS (refrigerated cooling system) cooling accessory and an auto sampler. A nitrogen purge gas flow of 50 ml/min was used throughout. The sample was pressed into a thin film using a press at 175° C. and 1500 psi (10.3 MPa) maximum pressure for about 15 seconds, then air-cooled to room temperature at atmospheric pressure. About 3 to 10 mg of material was then cut into a 6 mm diameter disk using a paper hole punch, weighed to the nearest 0.001 mg, placed in a light aluminum pan (ca 50 mg) and then crimped shut. The thermal behavior of the sample was investigated with the following temperature profile: The sample was rapidly heated to 180° C. and held isothermal for 3 minutes in order to remove any previous thermal history. The sample was then cooled to −40° C. at 10° C./min cooling rate and was held at −40° C. for 3 minutes. The sample was then heated to 150° C. at 10° C./min heating rate. The cooling and second heating curves were recorded.

Gel Permeation Chromatography (GPC)

The following procedure was used to determine the molecular architecture of various polymer compositions. The chromatographic system consisted of a Waters (Millford, Mass.) 150° C. high temperature gel permeation chromatograph equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories.

The carousel compartment was operated at 140° C. and the column compartment was operated at 150° C. The columns used were four Shodex HT 806M 300 mm, 13 μM columns and one Shodex HT803M 150 mm, 12 μm column. The solvent used was 1,2,4 trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters and the flow rate was 0.67 milliliters/min.

Calibration of the GPC column set was performed with 21 narrow molecular weight distribution polystyrene standards with molecular weights ranging from 580 to 8,400,000 g/mol which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first and in order of decreasing highest molecular weight component to minimize degradation. The polystyrene standard peak molecular weights were converted to polyethylene molecular weights using equation 8 (as described in Williams and Ward, J. Polym. Sci., Polym. Let., 6, 621 (1968)):

$$M\text{polyethylene} = A \times (M\text{polystyrene})^B \quad (1)$$

Where M is the molecular weight, A has a value of 0.41 and B is equal to 1.0.

The Systematic Approach for the determination of multi-detector offsets was done in a manner consistent with that published by Balke, Mourey, et al. (Mourey and Balke, Chromatography Polym. Chpt 12, (1992) and Balke, Thitiratsakul, Lew, Cheung, Mourey, Chromatography Polym. Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight which was measured in reference to NIST polyethylene homopolymer standard 1475. The chromatographic concentrations were assumed low enough to eliminate addressing 2nd Virial coefficient effects (concentration effects on molecular weight).

Molecular weight calculations were performed using in-house software. The calculation of the number-average molecular weight, weight-average molecular weight, and z-average molecular weight were made according to the following equations assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

$$\text{a)} \quad \overline{Mn} = \frac{\sum_i Wf_i}{\sum_i (Wf_i / M_i)} \quad (2)$$

$$\text{b)} \quad \overline{Mw} = \frac{\sum_i (Wf_i * M_i)}{\sum_i Wf_i}$$

$$\text{c)} \quad \overline{Mz} = \frac{\sum_i (Wf_i * M_i^2)}{\sum_i (Wf_i * M_i)}$$

The term "bimodal" as used herein means that the MWD in a GPC curve exhibits two component polymers wherein one component polymer may even exist as a hump, shoulder or tail relative to the MWD of the other component polymer. A bimodal MWD can be deconvoluted into two components: LMW component and HMW component. After deconvolution, the peak width at half maxima (WAHM) and the average molecular weight ($M_w$) of each component can be obtained. Then the degree of separation (DOS) between the two components can be calculated by equation 3:

$$DOS = \frac{\log(M_w^H) - \log(M_w^L)}{WAHM^H + WAHM^L} \quad (3)$$

wherein $M_w^H$ and $M_w^L$ are the respective weight average molecular weight of the HMW component and the LMW component; and WAHM$^H$ and WAHM$^L$ are the respective peak width at the half maxima of the deconvoluted molecular weight distribution curve for the HMW component and the LMW component. The DOS for the new composition is about 0.01 or higher. In some embodiments, DOS is higher than about 0.05, 0.1, 0.5, or 0.8. Preferably, DOS for the bimodal components is at least about 1 or higher. For example, DOS is at least about 1.2, 1.5, 1.7, 2.0, 2.5, 3.0, 3.5, 4.0, 4.5, or 5.0. In some embodiments, DOS is between about 5.0 to about 100, between about 100 to 500, or between about 500 to 1,000. It should be noted that DOS can be any number in the above range. In other embodiments, DOS exceeds 1,000.

ATREF

In some embodiments the bimodality of the distributions is characterized by the weight fraction of the highest temperature peak in temperature rising elution fractionation (typically abbreviated as "TREF") data as described, for example, in Wild et al., Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. The weight fraction corresponding to the highest temperature peak is referred to as the high-density fraction, since it contains little or no short chain branching. The remaining fraction is therefore referred to as the short chain branching (SCB) fraction, since it represents the fraction which contains nearly all the short-chain branching inherent to the polymer. This fraction is also the low density fraction.

In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene) and allowed to crystallized in a column containing an inert support (for example, stainless steel shot) by slowly reducing the temperature. The column is equipped with both an infra-red detector and a differential viscometer (DV) detector. An ATREF-DV chromatogram curve is then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference. WO 99/14271 also describes a suitable deconvolution technique for multi-component polymer blend compositions. The ATREF curve is also frequently called the short chain branching distribution (SCBD), since it indicates how evenly the comonomer (for example, hexene) is distributed throughout the sample in that as elution temperature decreases, comonomer content increases. The refractive index detector provides the short chain distribution information and the differential viscometer detector provides an estimate of the viscosity average molecular weight. A discussion of the preceding may be found in L. G. Hazlitt, *J. Appl. Polym. Sci,: Appl. Poly. Symp.*, 45, 25-37 (1990), which is incorporated herein by reference.

Swell

The resin swell was measured by the Dow Lab Swell method which consists of measuring as the time required by an extruded polymer strand to travel a pre-determined distance of 230 mm. The Göttfert Rheograph 2003 with, 12 mm barrel and, equipped with a 10 L/D capillary die was is used for the measurement. The measurement was carried out at 190° C., at two fixed shear rates, 300 s$^{-1}$ and 1,000 s$^{-1}$, respectively. The more the resin swells, the slower the free strand end travels and, the longer it takes to cover 230 mm. The swell is reported as t300 and t1000 (s) values.

Rheology

The sample was compression molded into a disk for rheology measurement. The disks were prepared by pressing the samples into 0.071" (1.8 mm) thick plaques and were subsequently cut into 1 in (25.4 mm) disks. The compression molding procedure was as follows: 365° F. (185° C.) for 5 min at 100 psi (689 kPa); 365° F. (185° C.) for 3 min at 1500 psi (10.3 MPa); cooling at 27° F. (15° C.)/min to ambient temperature (about 23° C.).

The resin rheology was measured on the ARES I (Advanced Rheometric Expansion System) Rheometer. The ARES is a strain controlled rheometer. A rotary actuator (servomotor) applies shear deformation in the form of strain to a sample. In response, the sample generates torque, which is measured by the transducer. Strain and torque are used to calculate dynamic mechanical properties such as modulus and viscosity. The viscoelastic properties of the sample were measured in the melt using a parallel plate set up, at constant strain (5%) and temperature (190° C.), and as a function of varying frequency (0.01 to 500 s$^{-1}$). The storage modulus (G'), loss modulus (G"), tan delta, and complex viscosity (eta*) of the resin were determined using Rheometrics Orchestrator software (v. 6.5.8).

Low shear rheological characterization was performed on a Rheometrics SR5000 in stress controlled mode, using a 25 mm parallel plates fixture. This type of geometry was preferred to cone and plate because it requires only minimal squeezing flow during sample loading, thus reducing residual stresses.

Flexural and Secant Modulus Properties

The resin stiffness was characterized by measuring the Flexural Modulus at 5% strain and Secant Modulii at 1% and 2% strain, and a test speed of 0.5 inch/min (13 mm/min) per ASTM D 790-99 Method B. The specimens were compression molded according to ASTM D-4703-00 Annex 1 with a 5 min initial heating period at about 190° C. and a 15° C./min cooling rate per Procedure C. The specimen was cooled to 45° C. in the press with continued cooling until "cool to the touch.

Tensile Properties

Tensile strength at yield and elongation at break were measured according to ASTM D-638-03. Both measurements were performed at 23° C. on rigid type IV specimens which were compression molded per ASTM D 4703-00 Annex A-1 with a 5 min initial heating period at about 190° C. and a 15° C./min cooling rate per Procedure C. The specimen was cooled to 45° C. in the press with continued cooling until "cool to the touch".

Environmental Stress Crack Resistance (ESCR)

The resin environmental stress crack resistance (ESCR) was measured per ASTM-D 1693-01 Method B. Specimens were molded according to ASTM D 4703-00 Annex A with a 5 min initial heating period at about 190° C. and a 15° C./min cooling rate per Procedure C. The specimen was cooled to 45° C. in the press with continued cooling until "cool to the touch".

In this test, the susceptibility of a resin to mechanical failure by cracking is measured under constant strain conditions, and in the presence of a crack accelerating agent such as, soaps, wetting agents, etc. Measurements were carried out on notched specimens, in a 100% by volume Igepal CO-630 (vendor Rhone-Poulec, N.J.) aqueous solution, maintained at 50° C. Ten specimens were evaluated per measurement. The ESCR value of the resin is reported as $F_{50}$, the calculated 50% failure time from the probability graph.

Impact Strength

The Izod impact strength (ft. lb/in) was determined for notched compression molded plaques at 23° C. and −40° C. according to ASTM D 256-03 Method A using a Tinius Olsen Izod Manual Impact device with a 200 inch-pound capacity pendulum.

The Izod compression molded plaques were prepared per ASTM D 4703-00 Annex A with a 5 min initial heating period at about 190° C. and a 15° C./min cooling rate per Procedure C. The specimen was cooled to about 45° C. in the press with continued cooling until "cool to the touch".

HDPE Impact Property Modification

The components used to produce impact modified high density polyethylene (HDPE) blends are listed in Table 10.

reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatil-

TABLE 10

Blend Components

| Material | Description | Source | Density $(g/cm^3)$ | Melt Index $I_{2.16}$ (dg/min) | Flow Index $I_{21.6}$ (dg/min) |
|---|---|---|---|---|---|
| UNIVAL* DMDA 6230 | High density polyethylene | Commercial polymer from The Dow Chemical Company (TDCC) | 0.949 | 0.3 | 25 |
| UNIVAL* DMDH 6400 | High density polyethylene | Commercial polymer from The Dow Chemical Company (TDCC) | 0.961 | 0.8 | 57 |
| Example A | Impact modifying multi-block polymer | TDCC | 0.930 | 0.5 | — |
| Example B | Impact modifying multi-block polymer | TDCC | 0.909 | 0.5 | — |
| Example C | Impact modifying polymer | TDCC | 0.922 | 0.5 | — |
| Example D | Impact modifying polymer | TDCC | 0.913 | 0.5 | — |
| IRGANOX 1010 | Polymer stabilization additive | Ciba | — | — | — |
| IRGAFOS 168 | Polymer stabilization additive | Ciba | — | — | — |

Polymerization Conditions

The polymerization process conditions used to produce the inventive and comparative samples are described below.

Example A Multi-block Polymer Production Conditions

Continuous solution polymerizations are carried out in a computer controlled autoclave reactor equipped with an internal stirrer. Purified mixed alkanes solvent (ISOPAR™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the izing extruder and water cooled pelletizer. Process details and results are contained below in Table 11.

Example B Multi-block Polymer Production Conditions

Continuous solution polymerizations are carried out in a computer controlled well-mixed reactor equipped with an internal stirrer. Purified mixed alkanes solvent (ISOPAR™ E available from ExxonMobil Chemical Company), ethylene at 5.96 lbs/hour (2.7 kg/hour), 1-octene, and hydrogen (where used) are supplied to a 5.0 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 406 psig (2.8 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated up through heat exchangers, and passes two devolatizers in series before it is water cooled Process details and results are contained below in Table 11.

TABLE 11

Multi-block Polymer Sample Production Conditions

| Process Conditions | Units | Example A | Example B |
|---|---|---|---|
| $C_2H_4$ | kg/h (lb/h) | 1.85 (4.08) | 2.75 |
| $C_8H_{16}$ | kg/h (lb/h) | 0.43 (0.95) | 1.65 |
| Solv. | kg/h (lb/h) | 15.87 (34.99) | 23 |
| $H_2$ | sccm | 11.4 | 2 |
| T | ° C. | 135.1 | 125 |
| Cat A1[2] Conc | ppm | 95.2 | 115.9 |
| Cat A1 Flow | kg/h (lb/h) | 0.075 (0.165) | 0.245 |
| Cat B2[3] Conc | ppm | 41.8 | 59.2 |
| Cat B2 Flow | kg/h (lb/h) | 0.145 (0.319) | 0.21 |
| DEZ Conc | ppm | 4055 | 5000 |
| DEZ Flow | kg/h (lb/h) | 0.149 (0.328) | 0.272 |
| Cocat Conc | ppm | 1215.5 | 1665.6 |
| Cocat Flow | kg/h (lb/h) | 0.112 (0.248) | 0.16 |
| Zn[4] in Polymer | ppm | 347.1 | 802.6 |
| Poly Rate[5] | kg/h (lb/h) | 1.736 (3.827) | 3 |

TABLE 11-continued

Multi-block Polymer Sample Production Conditions

| Process Conditions | Units | Example A | Example B |
|---|---|---|---|
| $C_2H_4$ Conversion[6] | % | 90 | 90 |
| Solids | % | 9.564 | 11.538 |
| Efficiency[7] |  | 132 | 73 |

[1]standard $cm^3$/min
[2][N-(2,6-di(1-methylethyl)phenyl)amido)(2-isopropylphenyl)(a-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dimethyl
[4]ppm in final product calculated by mass balance
[5]polymer production rate
[6]weight percent ethylene conversion in reactor
[7]efficiency, kg polymer/g M where g M = g Hf + g Z Examples C and Example D are made in accordance with U.S. Pat. No. 5,272,236 and U.S. Pat. No. 5,278,272, adjusted of course, for molecular weight and density.

Blend Preparation

A series of high density polyethylene a) DMDF 6230+ impact modifying polymer (inventive or comparative polymer) blends and b) DMDH 6400+impact modifying polymer (inventive or comparative polymer) blends are prepared by melt blending various concentrations of the two components (Table 12). For comparison purposes the HDPE samples are subjected to the same thermal extrusion history as the impact modified HDPE blend samples. The concentration of the comparative polymer in the blend is adjusted to produce the same overall blend density as the inventive-HDPE blends.

Prior to processing the blends a powdered antioxidant package is added to a physical mixture of the two components in a sealed bag. The package consists of 200 ppm IRGNOX 1010 and 400 ppm IRGAFOS 168. The physical polymer blend is tumbled to disperse the antioxidant throughout the resin sample. Each physical blend is purged with nitrogen to help remove any residual oxygen from the bag.

TABLE 12

Blend Composition

| Sample | Impact modifying polymer | DMDH 6400 concentration in blend | Impact modifying polymer concentration in blend | Calculated Blend density |
|---|---|---|---|---|
|  | Units |  |  |  |
|  | — | wt % | wt % | g/cm³ |
| Unival DMDA 6230 (HD1) | None | 100 | 0 | — |
| Inventive Blend HD1A1$_I$ | Example A | 95 | 5 | 0.948 |
| Inventive Blend HD1A2$_I$ | Example A | 90 | 10 | 0.9471 |
| Inventive Blend HD1A3$_I$ | Example A | 80 | 20 | 0.9451 |
| Unival DMDH 6400H (HD2) | None | 100 | 0 | — |
| Inventive Blend HD2A1$_I$ | Example A | 95 | 5 | 0.9594 |
| Inventive Blend HD2A2$_I$ | Example A | 90 | 10 | 0.9578 |
| Comparative Blend HD2C1$_C$ | Example C | 90 | 10 | 0.9575 |
| Inventive Blend HD2A3$_I$ | Example A | 80 | 20 | 0.9546 |
| Comparative Blend HD2C2$_C$ | Example C | 84 | 16 | 0.9546 |
| Comparative Blend HD2C3$_C$ | Example C | 78 | 22 | 0.9526 |
| Inventive Blend HD2B1$_I$ | Example B | 88 | 12 | 0.9544 |
| Comparative Blend HD2D1$_C$ | Example D | 87 | 13 | 0.9545 |
| Inventive Blend HD2B2$_I$ | Example B | 85 | 15 | 0.9528 |
| Comparative Blend HD2D2$_C$ | Example D | 83 | 17 | 0.9526 |

The physical polymer blend+additive package combination is processed on a Haake system supplied with a Leistritz 18 mm twin screw extruder (L/D=30), a K-TRON K2VT20 twin screw auger feeder equipped with long pitch powder screws, two refrigerated water circulation bath quench tanks, and a Berlyn PELL-2 4 blade strand chopper. A water circulator is attached to the jacket of the feed throat of the extruder and set at 20° C. to keep the polymer from melting and bridging the feed throat. The extruder temperature zones are set at 150, 180, 200, 215, and 215° C. The extruder die is set at 215° C. Prior to extrusion a lid supplied with a nitrogen line is placed on top of the feed hopper. The transition area from the feeder discharge to the extruder feed throat cone is sealed with heavy aluminum foil. The extruder is preheated, calibrated, and run empty with nitrogen flowing throughout the system to purge it of oxygen.

The physical polymer/antioxidant blend is placed in the extruder feed hopper with the nitrogen supplied lid in place. The physical blend is fed to the extruder, melt blended and extruded. The extrudate is passed through the two quench tanks to solidify the melt into a polymer strand. The strand is passed through an air knife to remove water, and subsequently chopped into pellets by the Berlyn strand chopper. The pellets are collected from the discharge chute into a labeled bag.

The blend density is calculated using the relation $$\frac{1}{\rho_b} = \frac{w_1}{\rho_1} + \frac{1-w_1}{\rho_2}$$

Where, $\rho_b$ is the blend density, $w_i$ the weight fraction of blend component 1, $\rho_1$ the density of component 1, and $\rho_2$ the density of blend component 2.

HDPE Blend Properties

The neat HDPE DMDH 6400 polymer and the blend samples are characterized by various analytical methods.

Figure 8A:
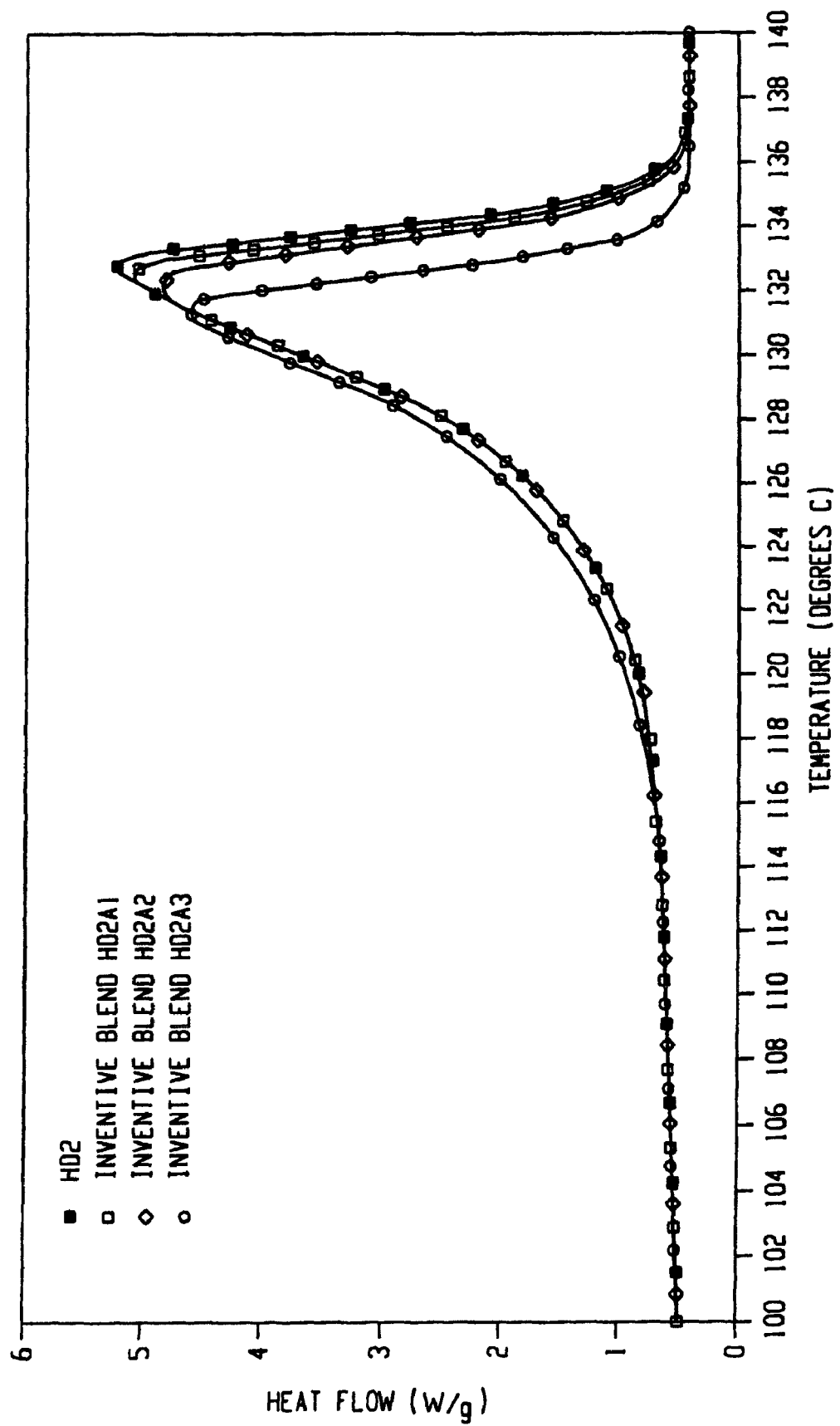
FIGS. 8A and 8B show a DSC Overlay: HDPE DMDH 6400+Example A Blends.
Figure 8B:
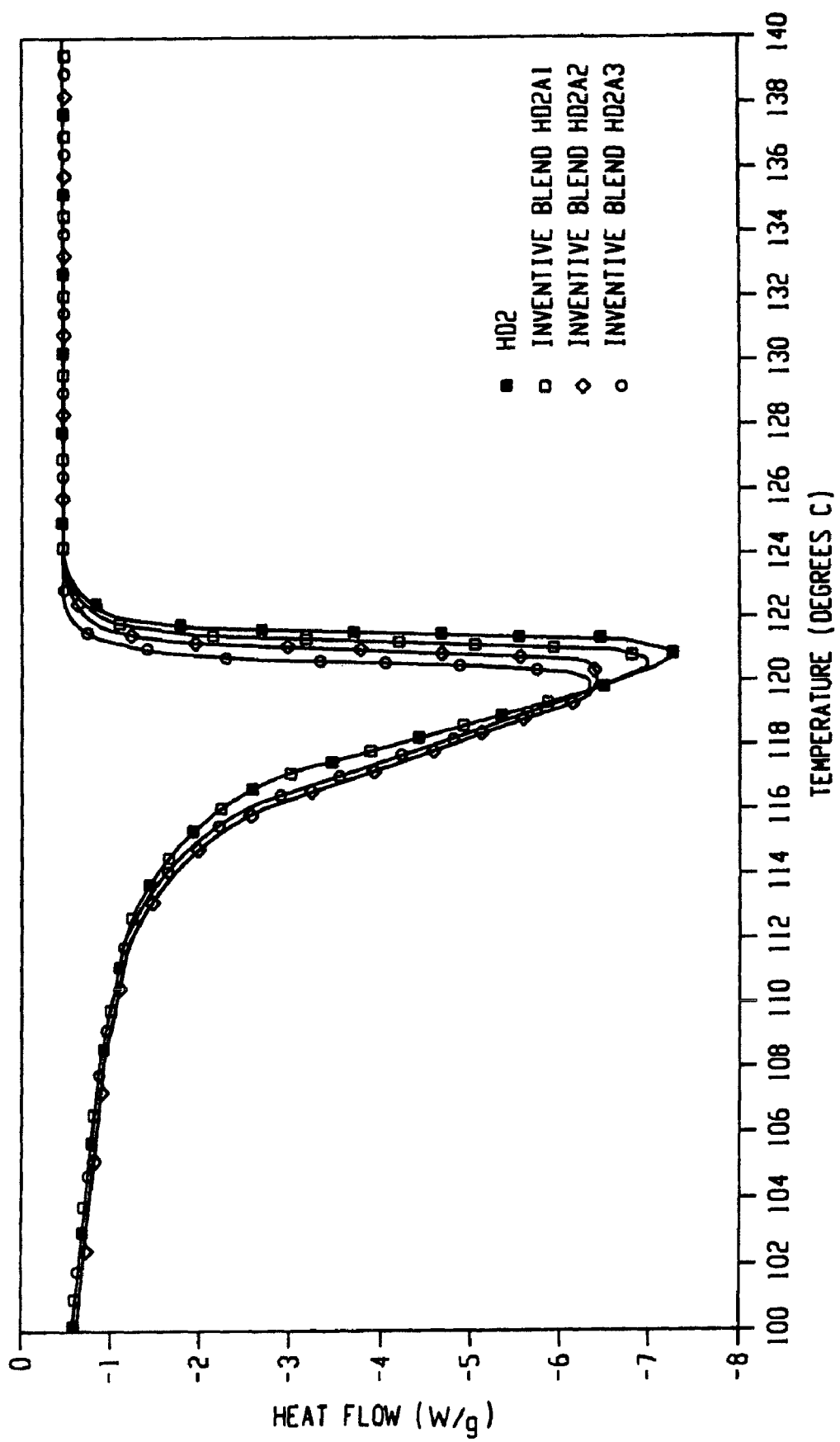
Figure 9:
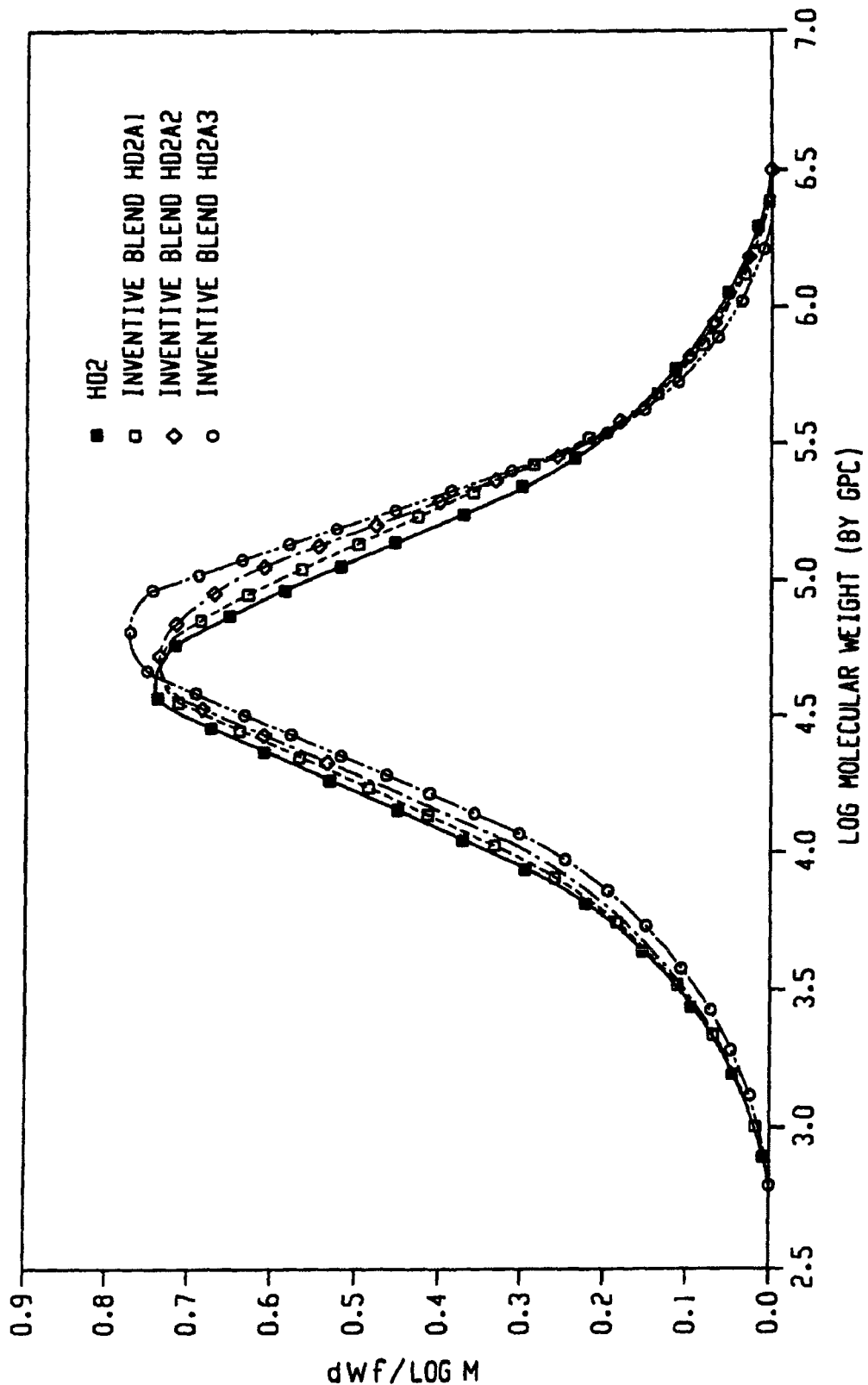
FIG. 9 shows a GPC Overlay: HDPE DMDH 6400+Example A Blends.
Figure 10:
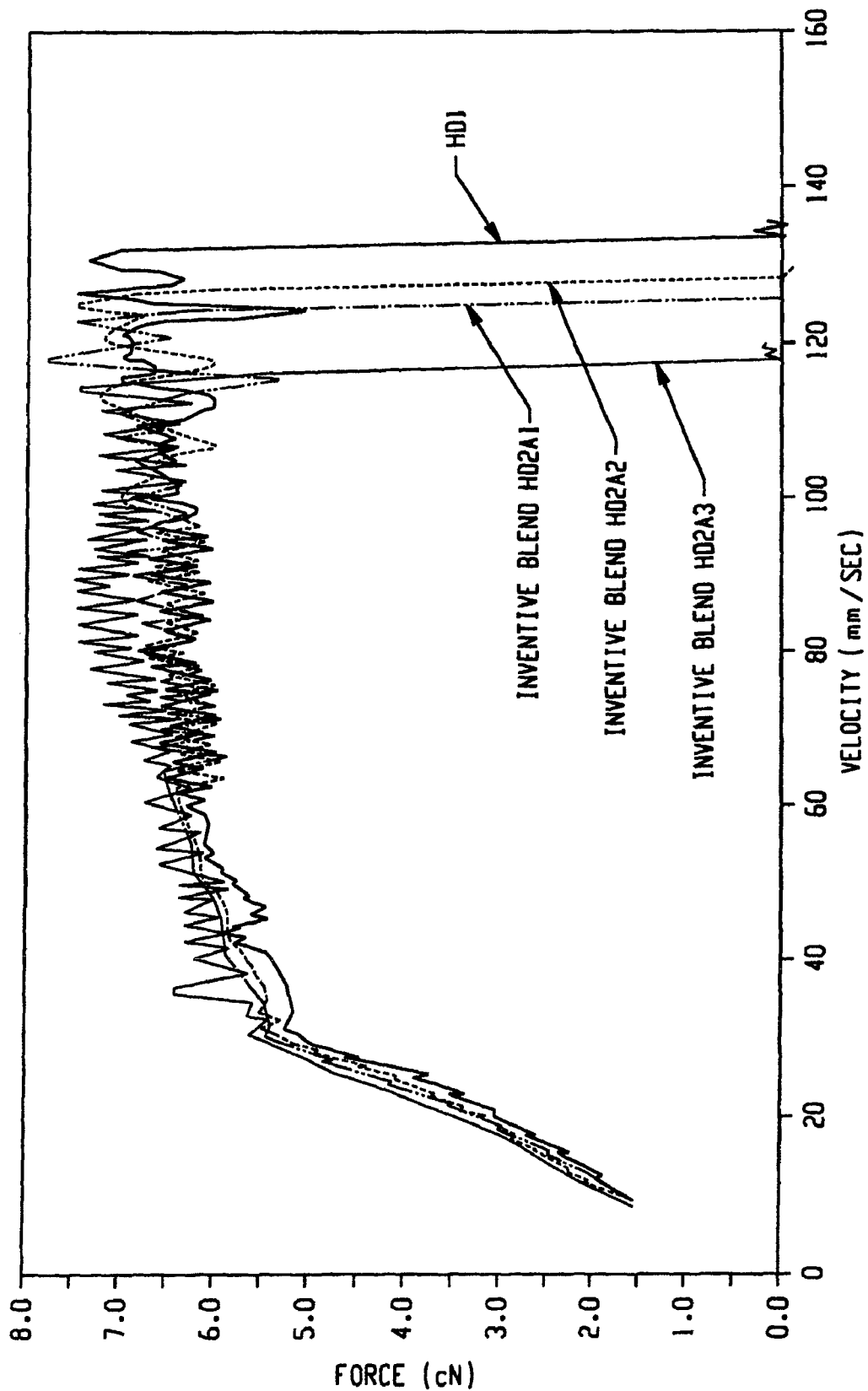
FIG. 10 shows a Melt Strength Comparison: HDPE DMDH 6400+Example A Blends.

The DSC overlay of HDPE DMDH 6400 and the DMDH 6400+inventive impact modifying multi-block polymer Example A, blends are shown in FIG. 8. A single DSC peak is observed indicating the compatibility of the two components. The molecular weight distribution as characterized by GPC is shown in FIG. 9. The melt strength comparison is shown in FIG. 10.

The measured properties are listed in Table 13.

TABLE 13

HDPE-Impact Modifying Polymer Blend Physical Properties

| Sample | Impact modifying polymer | Impact modifying polymer conc in blend wt % | Calculated Blend density g/cm³ | Density g/cm³ | Melt Index $I_{2.16}$ dg/min | Flow Index $I_{21.6}$ dg/min | Melt Flow Ratio $I_{21.6}/I_{2.16}$ |
|---|---|---|---|---|---|---|---|
| Unival DMDA 6230 (HD1) | None | 0 | — | 0.9501 | 0.26 | 28.0 | 108 |
| Inventive Blend HD1A1$_I$ | Example A | 5 | 0.948 | 0.9486 | 0.24 | 26.5 | 109 |
| Inventive Blend HD1A2$_I$ | Example A | 10 | 0.9471 | 0.9474 | 0.26 | 25.2 | 96 |
| Inventive Blend HD1A3$_I$ | Example A | 20 | 0.9451 | 0.9449 | 0.30 | 20.0 | 67 |
| Unival DMDH 6400H | None | 0 | — | 0.9617 | 0.88 | 67.9 | 77 |
| Inventive Blend HD2A1$_I$ | Example A | 5 | 0.9594 | 0.9597 | 0.83 | 97.1 | 117 |
| Inventive Blend HD2A2$_I$ | Example A | 10 | 0.9578 | 0.9582 | 0.77 | 50.8 | 66 |
| Comparative Blend HD2C1$_C$ | Example C | 10 | 0.9575 | 0.9579 | 0.78 | 49.5 | 63 |
| Inventive Blend HD2A3$_I$ | Example A | 20 | 0.9546 | 0.9545 | 0.71 | 37.9 | 53 |
| Comparative Blend HD2C2$_C$ | Example C | 16 | 0.9546 | 0.9536 | 0.71 | 40.8 | 57 |
| Comparative Blend HD2C2$_C$ | Example C | 22 | 0.9526 | 0.9521 | 0.73 | 35.7 | 49 |
| Inventive Blend HD2B1$_I$ | Example B | 12 | 0.9544 | 0.9555 | 0.79 | 48.5 | 61 |
| Comparative Blend HD2D1$_C$ | Example D | 13 | 0.9545 | 0.9546 | 0.74 | 43.8 | 59 |
| Inventive Blend HD2B2$_I$ | Example B | 15 | 0.9528 | 0.9536 | 0.73 | 45 | 62 |
| Comparative Blend HD2D2$_C$ | Example D | 17 | 0.9526 | 0.9518 | 0.69 | 40 | 58 |

Figure 11:
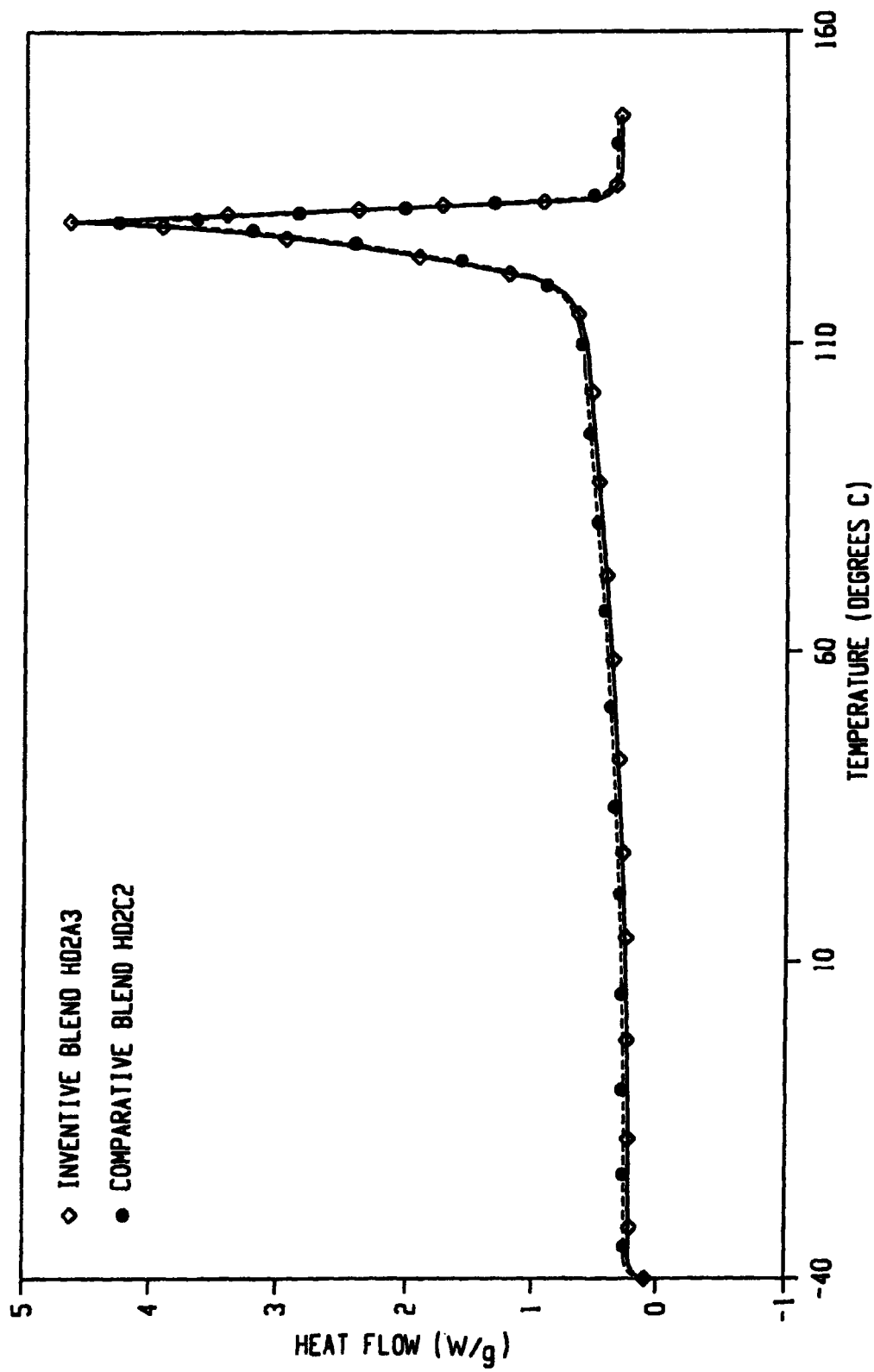
FIG. 11 shows DSC Curves of Inventive and Comparative Samples.
Figure 12:
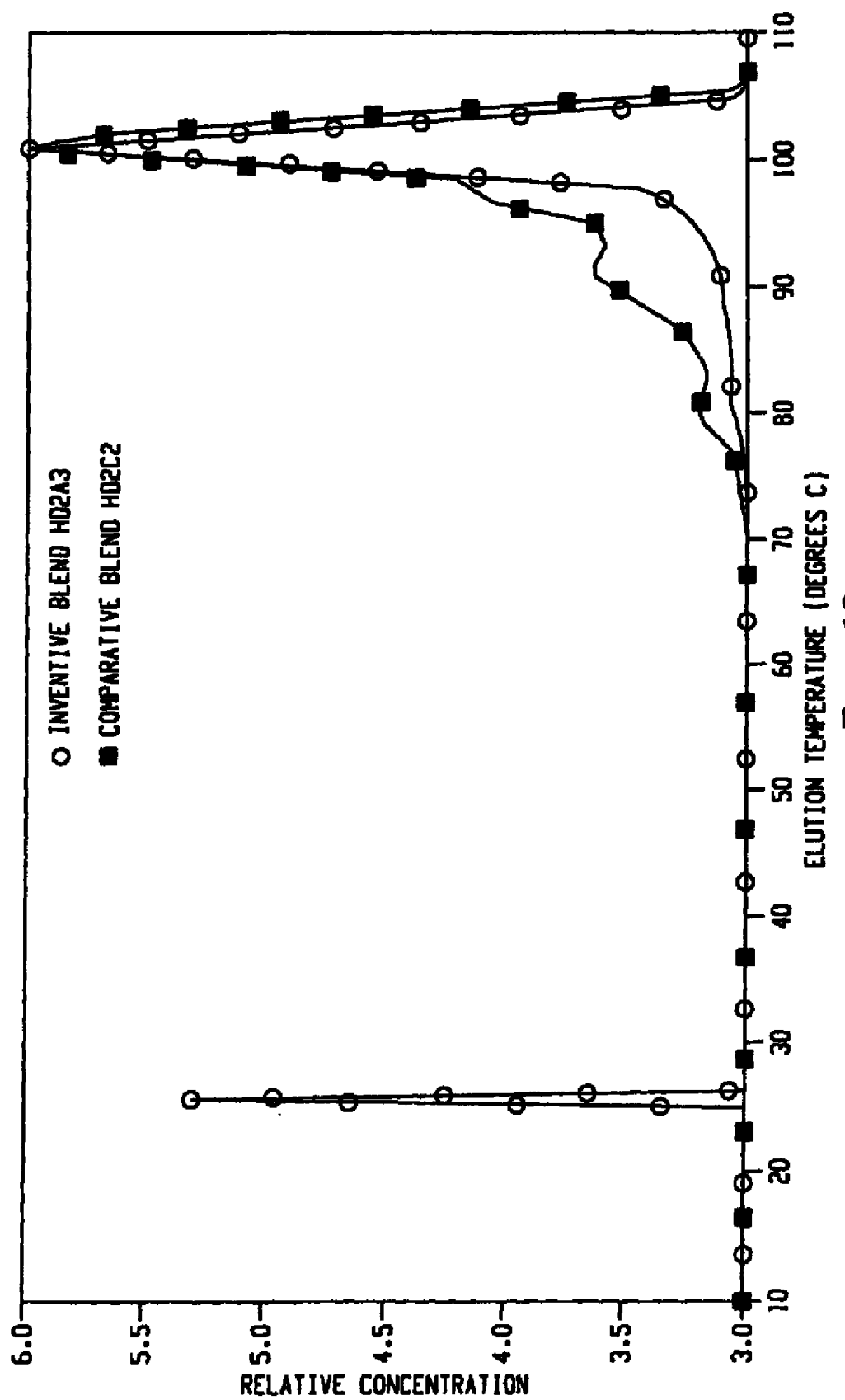
FIG. 12 shows ATREF Curves of Inventive and Comparative Samples.

The DSC comparison of the inventive and comparative samples is shown in FIG. 11 and the ATREF comparison in FIG. 12.

The mechanical (stiffness-toughness) properties of the inventive and comparative blends are listed in Table 14.

TABLE 14

HDPE-Impact Modifying Polymer Blend Mechanical Properties

| Sample | Impact modifying polymer | Impact modifying polymer blend conc wt % | Density g/cm$^3$ | Avg 2% Secant Modulus kpsi (GPa) | Avg Flex Modulus kpsi (GPa) | Tensile Yield stress kpsi (GPa) | Tensile Elongation to break % | 23° C. Izod Impact ft · lb/in (N · m/m) | −20° C. Izod Impact ft · lb/in (N · m/m) | ESCR 100% Igepal, 50° C., F50 h |
|---|---|---|---|---|---|---|---|---|---|---|
| Unival DMDA 6230 (HD1) | None | 0 | 0.9501 | 122.8 (0.846) | 185.2 (1.276) | — | — | 2.53 (135) | 1.62 (87) | 111 |
| Inventive Blend HD1A1$_I$ | Example A | 5 | 0.9486 | 123.9 (0.854) | 182.7 (1.260) | — | — | 3.18 (169) | 1.97 (105) | 207 |
| Inventive Blend HD1A2$_I$ | Example A | 10 | 0.9474 | 118.7 (0.818) | 173.7 (1.120) | — | — | 3.89 (208) | 2.28 (121) | 368 |
| Inventive Blend HD1A3$_I$ | Example A | 20 | 0.9449 | 112.4 (0.775) | 162.4 (1.120) | — | — | 7.37 (393) | 2.86 (153) | >800 |
| UNIVAL* DMDH 6400H | None | 0 | 0.9617 | 178.3 (1.229) | 244.1 (1.683) | — | — | 2.23 (119) | 2.19 (117) | 17 |
| Inventive Blend HD2A1$_I$ | Example A | 5 | 0.9597 | 168.4 (1.161) | 245.7 (1.694) | — | — | 3.36 (179) | 2.49 (133) | 24 |
| Inventive Blend HD2A2$_I$ | Example A | 10 | 0.9582 | 163.2 (1.125) | 245.1 (1.690) | — | — | 5.17 (276) | 2.77 (148) | 31 |
| Comparative Blend HD2C1$_C$ | Example C | 10 | 0.9579 | 158.0 (1.089) | 241.3 (1.663) | — | — | 4.15 (222) | 2.69 (144) | 27 |
| Inventive Blend HD2A3$_I$ | Example A | 20 | 0.9545 | 150.4 (1.037) | 233.5 (1.610) | 4.01 (0.028) | 1098 | 11.8 (631) | 5.31 (284) | 38 |
| Comparative Blend HD2C2$_C$ | Example C | 16 | 0.9536 | 154.6 (1.066) | 233.6 (1.610) | 3.82 (0.026) | 837 | 5.41 (289) | 3.07 (164) | 51 |
| Comparative Blend HD2C3$_C$ | Example C | 22 | 0.9521 | 139.1 (0.959) | 206.3 (1.422) | — | — | 6.72 (359) | 3.44 (184) | 107 |
| Inventive Blend HD2B1$_I$ | Example B | 12 | 0.9555 | 153.4 (1.057) | 234.9 (1.620) | — | — | 10.87 (581) | 2.96 (158) | 26 |
| Comparative Blend HD2D1$_C$ | Example D | 13 | 0.9546 | 150.2 (1.035) | 228.7 (1.576) | — | — | 10.46 (559) | 3.89 (208) | 52 |
| Inventive Blend HD2B2$_I$ | Example B | 15 | 0.9536 | 146.4 (1.010) | 221.4 (1.527) | 3.63 (0.025) | 883 | 13 (694) | 4.18 (223) | 29 |
| Comparative Blend HD2D2$_C$ | Example D | 17 | 0.9518 | 145.8 (1.005) | 216.8 (1.495) | 3.62 (0.025) | 831 | 12.1 (646) | 4.41 (236) | 123 |

Increasing the concentration of the inventive multi-block polymer, Example A, from 0 wt % to 10 wt % in the HD2 blend series, is accompanied by a gradual improvement in the blend impact and environmental stress crack resistance properties (Table 14). The blend stiffness, as characterized by the density and flex modulus, is basically unchanged. However, on increasing the Example A polymer concentration to 20% a significant improvement in the room temperature and low temperature Izod impact performance of the blend (Inventive blend HD2A3$_1$) is observed (Table 14). The (DMDH 6400 HD2+Example A) blend performance was compared to that of (DNDH 6400 HD2+Example C) polymer blends. In order to minimize the variables a comparison is made between blends of similar overall density and melt index. The DMDH 6400 HD2+Example A blends show a superior balance of stiffness and impact properties compared to the DMDH 6400 HD2+Example C blends. The tensile properties are also superior (Table 14). The second inventive blend series, (DMDH 6400 HD2+Example B) blends also have a good balance of flex modulus and impact resistance (Table 14). In this case the performance is similar to that of the comparative blends.

TPO Impact Property Modification

The raw materials used in preparing the compounded samples are shown in Table 15. The materials were used in the as received condition except for the ICP impact copolymer polypropylene sample. This sample was ground prior to use.

TABLE 15

Raw Materials

| Material | Description | Source |
|---|---|---|
| ICP | Impact copolymer polypropylene (35 MFR, 17% EPR) | Commercial polymer from The Dow Chemical Company |
| Example E | Impact modifying multi-block ethylene-octene copolymer | The Dow Chemical Company |
| Example F | Impact modifying multi-block ethylene-butene copolymer | The Dow Chemical Company |

TABLE 15-continued

Raw Materials

| Material | Description | Source |
|---|---|---|
| AFFINITY ® EG * 8150 (Example G) | Impact modifying ethylene-octene copolymer (0.868 density/0.5 MI) | Commercial polymer from The Dow Chemical Company |
| Jetfil 700C Talc | Compacted talc (1.5 µm median particle size) | Luzenac |
| IRGANOX B225 | IRGANOX 1010 + IRGAFOS 168 (50:50 ratio) | Ciba |
| Calcium Stearate | Mold release (NF grade) | Witco |

Polymerization Conditions

The multi-block octene copolymer Example E was produced using the process described immediately below.

Continuous solution polymerizations are carried out in a computer controlled autoclave reactor equipped with an internal stirrer. Purified mixed alkanes solvent (ISOPAR™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

The multi-block butene copolymer Example F was produced using the process described immediately below.

Continuous solution polymerizations are carried out in a computer controlled well-mixed reactor equipped with an internal stirrer. Purified mixed alkanes solvent (ISOPAR™ E available from ExxonMobil Chemical Company), ethylene at 5.96 lbs/hour (2.7 kg/hour), 1-butene, and hydrogen (where used) are supplied to a 5.0 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 406 psig (2.8 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated up through heat exchangers, and passes two devolatizers in series before it is water cooled Compounding Conditions All samples were compounded using a 30-mm W&P co-rotating twin-screw extruder with screw design ZSK30-0097. Vacuum was used during extrusion (18-20 inches of Hg). The tumble blended samples were fed in the feed throat of the extruder. The compounding conditions are shown in Table 16. It was desired to feed the sample at a rate to maintain around 80% torque. The extruder conditions were also adjusted to eliminate strand drops.

TABLE 16

| Compounding conditions | | | | | | | | |
|---|---|---|---|---|---|---|---|---|
| Zone 1 Temp. (° C.) | Zone 2 Temp. (° C.) | Zone 3 Temp. (° C.) | Zone 4 Temp. (° C.) | Zone 5 Temp. (° C.) | Melt Temp. (° C.) | Screw rpm | Torque % | Die Pressure (psi) |
| 167-190 | 184-206 | 197-213 | 192-207 | 198-223 | 198-222 | 398-411 | 55-93 | 90-260 |

Samples were injection molded in a 90 ton Toyo Molding Machine.
Mold: 1 cavity non-vented ASTM ⅛" T-bar and 1 cavity non-vented ASTM 4"×⅛" Disc
Molding Conditions:
Barrel temperature: 400° F.
Mold temperature: 140° F.
Fill time: 1.6 seconds
Packing pressure: 700 psi
Hold time: 25 seconds
Cool time: 25 seconds
Test Methods:
Izod—ASTM D256
Flex Properties—ASTM D790, 2 mm/min
Tensile Properties—ASTM D638, 50 mm/min
Sample Properties The notched Izod impact strength-temperature dependence of inventive blend samples ICP-E$_I$ and ICP-F$_I$, and comparative sample ICP-G$_C$ is shown in Table 17 and plotted in FIG. 13.

TABLE 17

Notched Izod Impact Test Results

| Component Sample # | ICP | Example G | Example E | Example F | Talc Jetfil 700C | Notched Izod impact test results (ft-lb/in) ASTM RT nIzod | ASTM 14° F. nIzod | ASTM 0° F. nIzod | ASTM −20° F. nIzod | ASTM −20° F. nIzod retest |
|---|---|---|---|---|---|---|---|---|---|---|
| ICP-Gc comparative blend | 63 | 27 | — | — | 10 | 13.84 | 13.35 | 10.1 | 1.753 | 1.539 |
| ICP-E$_1$ inventive blend | 63 | — | 27 | — | 10 | 13.83 | 13.78 | 12 | 10.288 | 9.447 |
| ICP-F$_1$ inventive blend | 63 | — | — | 27 | 10 | 12.25 | 11.91 | 9.5 | 6.735 | 7.561 |

The inventive examples show higher low temperature toughness than the comparative example.

Figure 13:
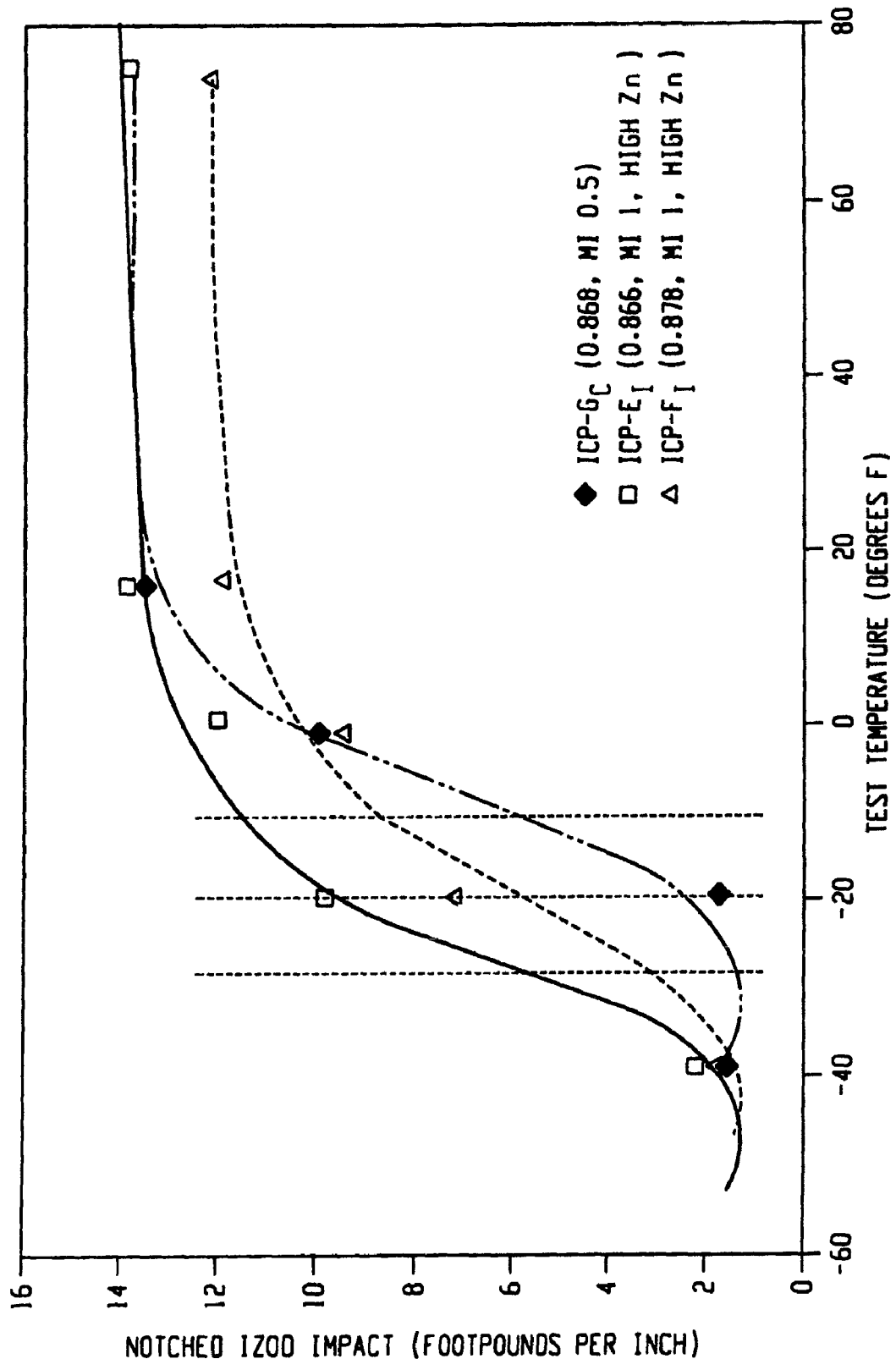
FIG. 13 shows Notched Izod Impact Dependence on Temperature.

Ductility of materials is often measured in terms of brittle-ductile transition temperature defined as the temperature below which a material fails in a brittle manner. For this comparison, the ductile-brittle transition temperature is defined as the temperature at which the notched Izod impact strength reaches about 6 ft-1b/in. FIG. 13 illustrates that the inventive examples (−20° F. for ICP-F$_I$; −30° F. for ICP-E$_I$) show lower ductile-brittle transition temperature than the comparative example (−10° F. for ICP-G$_C$). Given that the modulus of all three examples is similar, it follows that lower amount of the inventive modifier may be added to the formulation to increase its modulus or stiffness. The resulting blend should still have similar low temperature toughness as the comparative example. These data indicate that blends modified with the inventive polymer will have a better stiffness-toughness balance than those modified with the comparative modifiers.

Additional Blends Using OBC77 and REOC

The following polymers were employed in various blend compositions.

Inventive Example OBC77 is an ethylene/1-octene olefin block copolymer (OBC) having a composite 1-octene content of 77 wt. %, a composite density of 0.854 g/cc, a DSC peak melting point of 105° C., a hard segment level based upon DSC measurement of 6.8 wt. %, an ATREF crystallization temperature of 73° C., a hard segment density of 0.915 g/cc, a soft segment density of 0.851 g/cc, a number average molecular weight of 188,254 daltons, a weight average molecular weight of 329,600 daltons, a melt index at 190° C., 2.16 Kg of 1.0 dg/min and a melt index at 190° C., 10 Kg of 37.0 dg/min.

Comparative Example REOC is a random ethylene/1-octene copolymer (REOC) having a density of 0.87 g/cc, a 1-octene content of 38 wt. %, a peak melting point of 59.7° C., a number average molecular weight of 59,000 daltons, a weight average molecular weight of 121,300 daltons, a melt index of 1.0 dg/min at 190° C., 2.16 Kg and a melt index at 190° C., 10 Kg of 7.5 dg/min. The product is commercially available from The Dow Chemical Company under the tradename ENGAGE® 8100.

The above polymers were melt mixed with a polypropylene homopolymer (PPH) having a melt flow index at 230° C., 2.16 Kg of 2.0 dg/min, and a density of 0.9 g/cc. The product is commercially available under the commercial name of Dow Polypropylene H110-02N. For all blends, 0.2 parts per 100 total polymer of a 1:1 blend of phenolic/phosphite antioxidant, available under the tradename Irganox B215, was added for heat stability. This additive is designated as AO in Table I The following mixing procedure was used. A 69 cc capacity Haake batch mixing bowl fitted with roller blades was heated to 200° C. for all zones. The mixing bowl rotor speed was set at 30 rpm and was charged with PPH, allowed to flux for one minute, then charged with AO and fluxed for an additional two minutes. The mixing bowl was then charged with either Inventive Example OBC77, Comparative Example REOC, or a 1:1 blend of Inventive Example OBC77 and Comparative Example REOC. After adding the elastomer, the mixing bowl rotor speed was increased to 60 rpm and allowed to mix for an additional 3 minutes. The mixture was then removed from the mixing bowl and pressed between Mylar sheets sandwiched between metal platens and compressed in a Carver compression molding machine set to cool at 15° C. with a pressure of 20 kpsi. The cooled mixture was then compression molded into 2 inch×2 inch×0.06 inch plaques via compression molding for 3 minutes at 190° C., 2 kpsi pressure for 3 minutes, 190° C., 20 kpsi pressure for 3 minutes, then cooling at 15° C., 20 kpsi for 3 minutes. The mixtures prepared under the procedure described above are listed in Table 18 below.

TABLE 18

| Blends with PP Ingredient | Mixture1 parts | Mixture 2 parts | Mixture 3 parts |
|---|---|---|---|
| PPH | 70 | 70 | 70 |
| Inventive Example OBC77 | 30 | 0 | 15 |
| Comparative Example REOC | 0 | 30 | 15 |
| AO | 0.2 | 0.2 | 0.2 |

Compression molded plaques were trimmed so that sections could be collected at the core. The trimmed plaques were cryopolished prior to staining by removing sections from the blocks at −60° C. to prevent smearing of the elastomer phases. The cryo-polished blocks were stained with the vapor phase of a 2% aqueous ruthenium tetraoxide solution for 3 hrs at ambient temperature. The staining solution was prepared by weighing 0.2 gm of ruthenium (III) chloride hydrate (RuCl3×H2O) into a glass bottle with a screw lid and adding 10 ml of 5.25% aqueous sodium hypochlorite to the jar. The samples were placed in the glass jar using a glass slide having double sided tape. The slide was placed in the bottle in order to suspend the blocks about 1 inch above the staining solution. Sections of approximately 100 nanometers in thickness were collected at ambient temperature using a diamond knife on a Leica EM UC6 microtome and placed on 400 mesh virgin TEM grids for observation.

Bright-field images were collected on a JEOL JEM 1230 operated at 100 kV accelerating voltage and collected using Gatan 791 and Gatan 794 digital cameras. The images were post processed using Adobe Photoshop 7.0.

Figure 14:
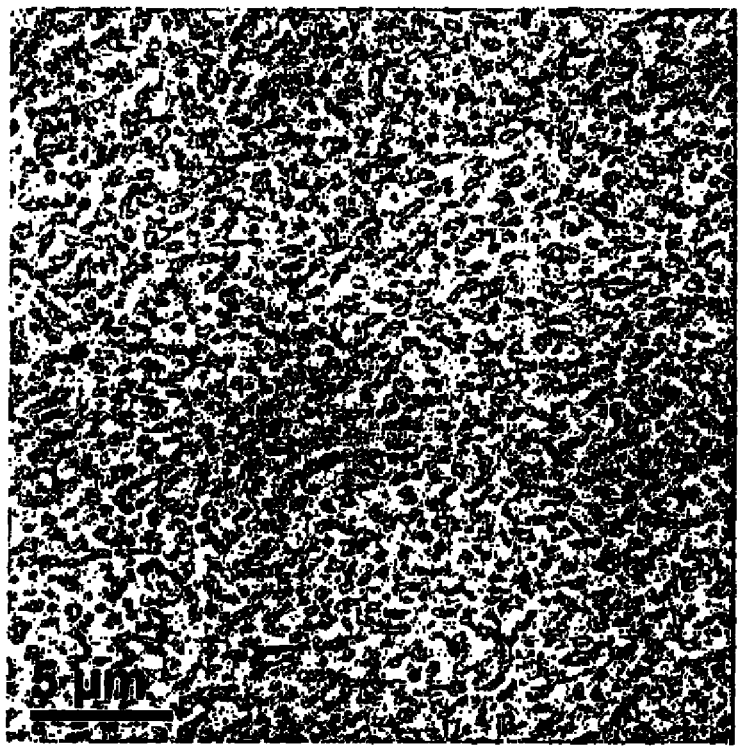
FIG. 14 is a transmission electron micrograph of a mixture of polypropylene and an ethylene-octene block copolymer.
Figure 15:
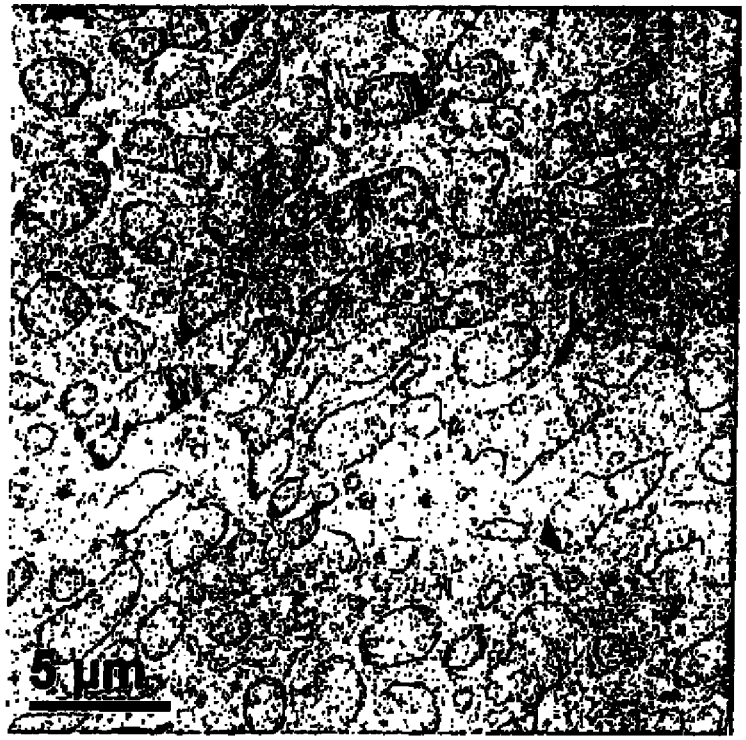
FIG. 15 is a transmission electron micrograph of a mixture of polypropylene and a random ethylene-octene copolymer.
Figure 16:
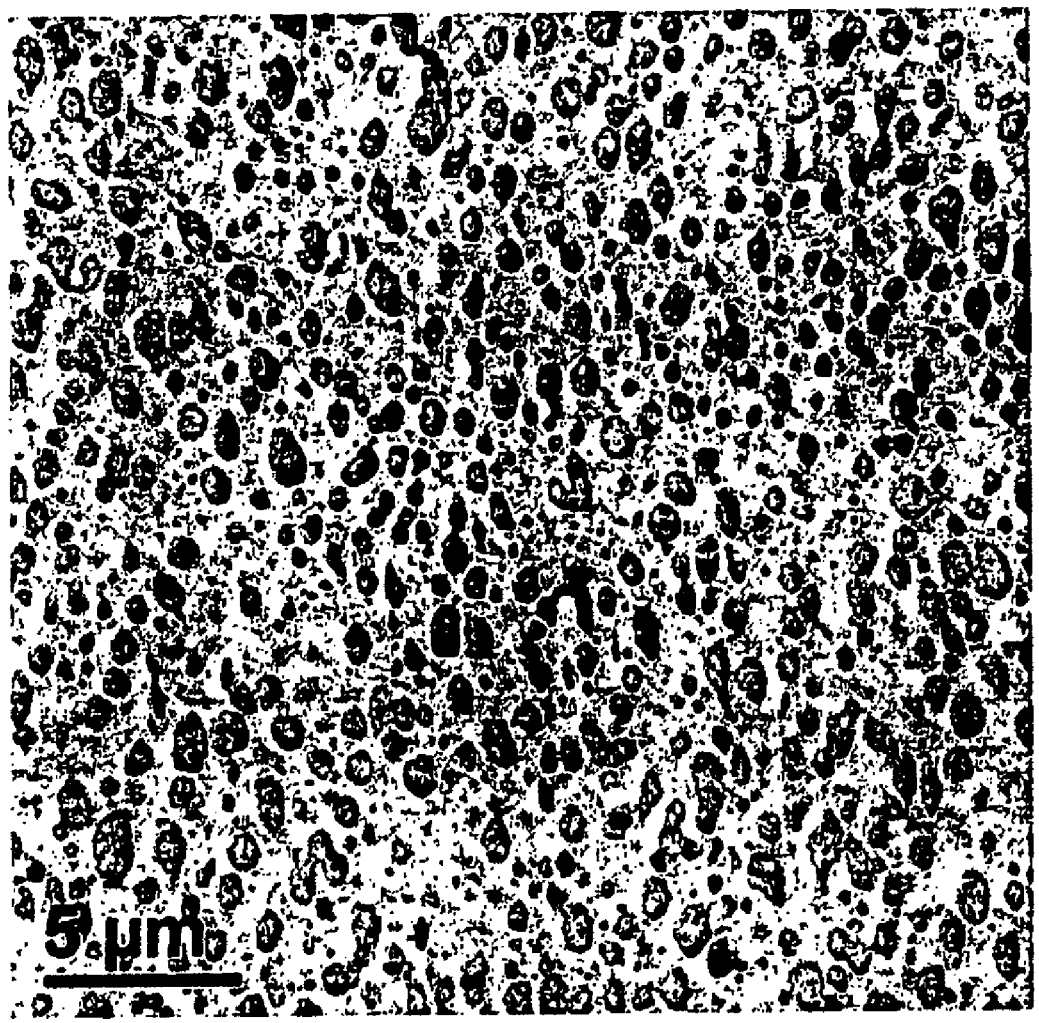
FIG. 16 is a transmission electron micrograph of a mixture of polypropylene, an ethylene-octene block copolymer, and a random ethylene-octene copolymer.

FIGS. 14, 15, and 16 are transmission electron micrographs of Mixtures 1, 2 and Mixture 3 above, respectively. The dark domains are the $RuCl_3 \cdot XH_2O$ stained ethylene/1-octene polymers. As can be seen, the domains containing Inventive Example OBC77 are much smaller than Comparative Example REOC. The domain sizes for Inventive Example OBC77 range from <0.1 to 2 µm, whereas the domain sizes for Comparative Example REOC from about 0.2 to over 5 µm. Mixture 3 contains a 1:1 blend of Inventive Example OBC77 and Comparative Example REOC. Note that the domain sizes for Mixture 3 are well below those for Mixture 2, indicating that Inventive Example OBC77 is improving the compatibility of Comparative Example REOC with PPH.

Image analysis of Mixtures 1, 2, and 3. was performed using Leica Qwin Pro V2.4 software on 5kX TEM images. The magnification selected for image analysis depended on the number and size of particles to be analyzed. In order to allow for binary image generation, manual tracing of the elastomer particles from the TEM prints was carried out using a black Sharpie marker. The traced TEM images were scanned using a Hewlett Packard Scan Jet 4c to generate digital images. The digital images were imported into the Leica Qwin Pro V2.4 program and converted to binary images by setting a gray-level threshold to include the features of interest. Once the binary images were generated, other processing tools were used to edit images prior to image analysis. Some of these features included removing edge features, accepting or excluding features, and manually cutting features that required separation. Once the particles in the images were measured, the sizing data was exported into a spreadsheet that was used to create bin ranges for the rubber particles. The sizing data was placed into appropriate bin ranges and a histogram of particle lengths (maximum particle length) versus percent frequency was generated. Parameters reported were minimum, maximum, average particle size and standard deviation. Table 19 below shows the results of the image analysis of mixtures domain sizes.

TABLE 19

| | Mixture Number | | |
|---|---|---|---|
| | 1 | 2 | 3 |
| Count (number) | 718 | 254 | 576 |
| Max. Domain Size (mm) | 5.1 | 15.3 | 2.9 |
| Minimum Domain Size (mm) | 0.3 | 0.3 | 0.3 |
| Mean Domain Size (mm) | 0.8 | 1.9 | 0.8 |
| Standard Deviation (mm) | 0.5 | 2.2 | 0.4 |

The results clearly showed that that both Mixtures 1 and 2 exhibited significantly lower mean elastomer domain size and narrower domain size distribution. The beneficial interfacial effect from Inventive Example 1 can be clearly seen as a 1:1 blend with Comparative Example A in Mixture 3. The resultant domain mean particle size and range are nearly identical to Mixture 1, which contains only Inventive Example 1 as the elastomer component.

Procedure for Making Inventive Example OBC77

The procedure for making OBC77 used in the aforementioned mixtures is as follows: A single one gallon autoclave continuously stirred tank reactor (CSTR) was employed for the experiments. The reactor runs liquid full at ca. 540 prig with process flow in the bottom and out the top. The reactor is oil jacketed to help remove some of the heat of reaction. Primary temperature control is achieved by two heat exchangers on the solvent/ethylene addition line. ISOPAR® E, hydrogen, ethylene, and 1-octene were supplied to the reactor at controlled feed rates.

Catalyst components were diluted in an air-free glove box. The two catalysts were fed individually at the desired ratio from different holding tanks. To avoid catalyst feed line plugging, the catalyst and cocatalyst lines were split and fed separately into the reactor. The cocatalyst was mixed with the diethylzinc chain shuttling agent before entry into the reactor.

Prime product was collected under stable reactor conditions after several hourly product samples showed no substantial change in melt index or density. The products were stabilized with a mixture of IRGANOX®1010, IRGANOX® 1076 and IRGAFOS®176. The polymerization conditions and polymer properties of the products are summarized in Table 20 below.

TABLE 20

| Density | I2 | I10/I2 | Temperature (° C.) | C2 flow (kg/hr) | C8 flow (kg/hr) | H2 flow (sccm) |
|---|---|---|---|---|---|---|
| 0.8540 | 1.05 | 37.90 | 120.0 | 0.600 | 5.374 | 0.9 |

| C2 conversion (%) | C8 conversion (%) | % solids | Polymer production rate (kg/hr) | Catalyst Efficiency (kg polymer/g total metal) | A1 Catalyst Flow (kg/hr) | A1 Catalyst Concentration (ppm) |
|---|---|---|---|---|---|---|
| 89.9 | 20.263 | 10.0 | 1.63 | 287 | 0.043 | 88.099 |

| A2 Catalyst Flow (kg/hr) | A2 Catalyst Concentration (ppm) | Mole % A2 | RIBS-2 Flow (kg/hr) | RIBS-2 Concentration (ppm) | DEZ flow (kg/hr) | DEZ concentration (ppm Zn) |
|---|---|---|---|---|---|---|
| 0.196 | 9.819 | 50.039 | 0.063 | 1417 | 0.159 | 348 |

Structures for Catalysts A1 and A2 are shown below:

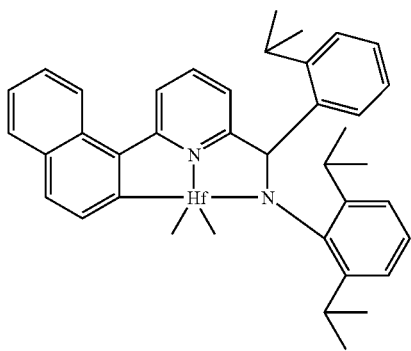

Catalyst A1 and

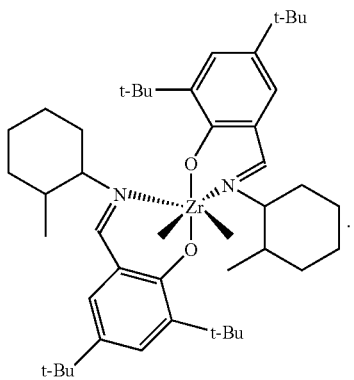

Catalyst A2

Examples of Maleic Anhydride Modified Polymers

Ethlylene-octene multi-block interpolymer base polymers were first prepared as described in PCT Application No. PCT/US2005/008917, filed on Mar. 17, 2005, which in turn claims priority to U.S. Provisional Application No. 60/553,906, filed Mar. 17, 2004 each of which is incorporated by reference herein. Comparative base polymers are random ethylene-octene copolymers prepared using a constrained geometry catalyst such as those sold under the name AFFINITY® by The Dow Chemical Company. Properties of the base polymers are listed in Table 21 below.

TABLE 21

| Base Polymer | Density (g/cc) | Melt Index ($I_2$) g/10 min | Copolymer Type | Block Type |
|---|---|---|---|---|
| AFFINITY® KC8852 | 0.875 | 3.0 g/10 | random | NA |
| AFFINITY® EG8200 | 0.87 | 5.0 g/10 | random | NA |
| Multi-block R21 | 0.877 | 4.7 | block | long |
| Multi-block R22 | 0.877 | 4.6 | block | short |

NA = Not Applicable
Melt Index ($I_2$): 190° C./2.16 kg

Multi-Block R21 and Multi-Block R22 Continuous Solution Polymerization, Catalyst A1/B2+DEZ Continuous solution polymerizations were carried out in a computer controlled, well-mixed reactor. Purified mixed alkanes solvent (ISOPAR™ E available from Exxon Mobil, Inc.), ethylene, 1-octene, and hydrogen (where used) were combined and fed to a 102 L reactor. The feeds to the reactor were measured by mass-flow controllers. The temperature of the feed stream was controlled by use of a glycol cooled heat exchanger before entering the reactor. The catalyst component solutions were metered using pumps and mass flow meters. The reactor was run liquid-full at approximately 550 psig pressure. Upon exiting the reactor, water and additive were injected in the polymer solution. The water hydrolyzes the catalysts, and terminates the polymerization reactions. The post reactor solution was then heated in preparation for a two-stage devolatization. The solvent and unreacted monomers were removed during the devolatization process. The polymer melt was pumped to a die for underwater pellet cutting. Process conditions are summarized in Table 22 below.

TABLE 22

Process Conditions for Multi-block R21 and Multi-block R22

|  | Multi-block R21 | Multi-block R22 |
|---|---|---|
| $C_2H_4$ (lb/hr)* | 55.53 | 54.83 |
| $C_8H_{16}$ (lb/hr) | 30.97 | 30.58 |
| Solvent (lb/hr) | 324.37 | 326.33 |
| $H_2$ (sccm[1]) | 550 | 60 |
| T (° C.) | 120 | 120 |
| Cat. A1[2] (ppm) | 600 | 600 |
| Cat. A1 Flow (lb/hr) | 0.216 | 0.217 |
| Cat. B2[3] (ppm) | 200 | 200 |
| Cat. B2 Flow (lb/hr) | 0.609 | 0.632 |

TABLE 22-continued

Process Conditions for Multi-block R21 and Multi-block R22

|  | Multi-block R21 | Multi-block R22 |
|---|---|---|
| DEZ Conc. wt % | 3.0 | 3.0 |
| DEZ Flow (lb/hr) | 0.69 | 1.39 |
| Cocat. 1 Conc. (ppm) | 4500 | 4500 |
| Cocat. 1 Flow (lb/hr) | 0.61 | 0.66 |
| Cocat. 2 Conc. (ppm) | 525 | 525 |
| Cocat. 2 Flow (lb/hr) | 0.33 | 0.66 |
| [DEZ]$^4$ in polymer (ppm) | 246 | 491 |
| Polymerization Rate$^5$ (lb/hr) | 84.13 | 82.56 |
| Conversion$^6$ (wt %) | 88.9 | 88.1 |
| Polymer (wt %) | 17.16 | 17.07 |
| Efficiency$^7$ | 293 | 280 |

*1 lb/hr = 0.45 kg/hr
$^1$standard cm$^3$/min
$^2$[N-(2,6-di(1-methylethyl)phenyl)amido)(2-isopropylphenyl)(α-naphthalen-2-diyl(6-pyridin-2-diyl)methane)]hafnium dimethyl
$^3$bis-(1-(2-methylcyclohexyl)ethyl)(2-oxoyl-3,5-di(t-butyl)phenyl)immino) zirconium dibenzyl
$^4$ppm in final product calculated by mass balance
$^5$polymer production rate
$^6$weight percent ethylene conversion in reactor
$^7$efficiency, kg polymer/g M, where, g M = g Hf + g Z Melt Maleation—Grafting MAH to Olefin Interpolymer in a Twin-Screw Extruder MAH-grafted resins were prepared in a continuous reactive extrusion process using a twin-screw extruder. The resins used for this process were AFFINITY® KC8852, AFFINITY® EG8200, Multi-block R21, and Multi-block R22 as described above. The apparatus was a 30-mm ZSK-30 extruder with a length-to-diameter ratio of 35.67. The temperature set point in the extruder was 235° C. The screw rotation rate was 300 RPM. Resin pellets were fed to the extruder at a rate of 10 lb/hr. The peroxide initiator was 2,5-bis(t-butylperoxy)-2,5-dimethylhexane. A solution, containing approximately 1.24 wt % peroxide, 49.38.wt % MAH, and 49.38 wt % methyl ethyl ketone, was fed into the extruder at a rate of approximately 6.17 g/min. This addition rate corresponded to the addition of 4 wt % MAH and 1000 ppm peroxide based on the mass of resin. A vacuum port was installed at the end of the extruder to remove methyl ethyl ketone and excess, ungrafted MAH. The grafted resin exited the extruder and was pelletized and collected.

Approximately 2.5 g of each grafted resin was dissolved in 100 mL of boiling xylene, and then precipitated by pouring the solution into five volumes of acetone. The solids were collected, dried, and titrated to determine the level of grafted MAH. The EO870 resin contained 1.85 wt % grafted MAH. The EO875 resin contained 1.85 wt % grafted MAH. The Multi-block R21 resin contained 1.80 wt % grafted MAH. The Multi-block R22 resin contained 1.49 wt % MAH. The grafted resins were blended with a polyamide resin as discussed below.

MAH-grafted Resin/Polyamide Blends

MAH-Grafted Resins

Melt index data on MAH-grafted resins are shown in Table 23 below.

TABLE 23

GPC and Melt Index Data

| Resin | Wt % grafted MAH | $I_2$ g/10 min |
|---|---|---|
| 1. MAH-g-AFFINITY ® EG8200* | 1.85 | 0.0912 |
| 2. MAH-g-AFFINITY ® KC8852* | 1.85 | 0.049 |
| 3. MAH-g-Multi-block R22 | 1.49 | 0.2393 |
| 4. MAH-g-Multi-block R21 | 1.80 | 0.1482 |

*Comparative resins
$I_2$: 190 C/2.16 kg

Blends: Representative Procedure

Approximately 454 grams of the maleic anhydride grafted resin (MAH-g-EO870, MAH-g-875, MAH-g-Multi-block R22 or the MAH-g-Multi-block R21) was pellet blended with 1816 grams of a polyamide (Ultramide® B-3, available from BASF), by feeding both resins into a 25 mm Haake twin screw extruder at an instantaneous rate of 2724 grams per hour. The extruder temperature profile was a constant 250° C. The collected sample was subsequently injection molded to produce ASTM test bars for IZOD and flexural modulus testing. Mechanical Test data is summarized in Table 24 below.

TABLE 24

Mechanical Data

| Resin | Avg. Flex. Strength psi | Avg. Flex. Mod. ksi | Avg. Secant Mod. @ 1% ksi | Avg. Izod-RT @ B-3833 ft-lbs/in | Avg. Izod J/m | Color of molded plaques |
|---|---|---|---|---|---|---|
| 1. MAH-g-, AFFINITY ® EG8200 | 5873 | 267 | 266 | 7.391 | 394.6 | tan |
| 2. MAH-g- AFFINITY ® KC8852 | 5799 | 265 | 265 | 10.08 | 537.9 | tan |
| 3. MAH-g-Multi-blockR22 | 5864 | 264 | 264 | 8.624 | 460.4 | tan |
| 4. MAH-g-Multi-blockR21 | 5463 | 246 | 246 | 7.346 | 392.2 | tan |

The lower viscosity Multi-block resins have comparable or even better mechanical properties, compared to the higher viscosity comparative resins.

The resins were made into injection molded plaques and tested for impact properties. The results are shown in Table 25 below.

TABLE 25

| Resin | Avg Flexural Modulus (ksi) | Impact Tester (30° C.) | Impact Tester (Room Temp) | Average Izod Impact (J/m) |
|---|---|---|---|---|
| 1. MAH-g-, AFFINITY ® EG8200 | 267 with standard deviation of 6 | 48.62 | 56.99 | 394.6 |
| 2. MAH-g- AFFINITY ® KC8852 | 265 with standard deviation of 4 | 58.18 | 56.64 | 537.9 |
| 3. MAH-g-Multi-blockR22 | 264 with standard deviation of 10 | 68.17 | 63.25 | 460.4 |
| 4. MAH-g-Multi-blockR21 | 246 with standard deviation of 9 | 63.92 | 66.25 | 392.2 |

Note: the Inventive polymers (Run #3 & 4) have significantly higher impact resistance at low temperature vs. the comparative samples (Run #1 & 2). Sample #3 has the best balance between high modulus and high impact. This improved impact is demonstrated at both room temperature and at low temperature. The test pieces were injection molded plaques and the test was completed using the procedure as outlined in ASTM D 3763 (Injection Molded Parts). Flex modulus was done according to ASTM D-790 and Izod impact was done according to D-256.

Examples 20-21 and Comparative Examples L-M

The ethylene/α-olefin interpolymer of Examples 20 and 21 and Comparative Examples L-M are made in a substantially similar manner as Examples 19A-I and Examples R21 and R22 above.

The soft segment and hard segment levels of Examples 20-21 and Comparative Examples L-M as well as the octene contents of the soft segments of Examples 20-21 and Comparative Examples L-M are determined by $^{13}$C NMR according to the following steps. A solvent mixture of 5:95 (weight: weight) of paradichlorobenzene-$d_4$ (PDCB-$d_4$) and o-dichlorobenzene (ODCB) containing 0.025 M of tris (acetylacetonato)chromium(III), ie., Cr(AcAc)$_3$, is purged with nitrogen by either bubbling a stream of nitrogen through the sample or by placing the sample in a nitrogen dry box for ca. 40 minutes to displace dissolved oxygen. Polymer samples are prepared as 6 wt. % solutions by adding 0.25 grams of polymer in 3.75 grams of solvent, taking care to insure a homogeneous solution. NMR data is acquired using a 400 MHz NMR spectrometer obtainable from VARIAN™ or BRUKER™. All measurements are made on non-spinning samples in locked mode. Prior to data acquisition, the samples are shimmed to optimize the magnetic field. The CH$_2$ backbone peak is used to assess the quality of the instrumental set-up. The $^{13}$C NMR chemical shifts are internally referenced to the methylene —(CH$_2$)— group at 30.00 ppm. A pre-defined integral range is applied to generate a list of integrals. The integrals for carbons on or near an octene repeat unit are matched to a library of spectra of ethylene/1-octene copolymers with different levels of octene. The match provided the octene level in the soft segment. The octene level for the hard segment is calculated from the soft segment. Polymer hardness (Shore A) is measured according to ASTM D1240. The modulus at 100% elongation is measured according to ASTM D638. The I$_2$ melt index is measured according to ASTM D1238. The properties of Examples 20-21 and Comparative Examples L-M are shown in Table 26 below.

TABLE 26

| Example | Soft segment content (wt. %) | Hard segment content (wt. %) | Octene content in soft segment (wt. %) | Shore A | 100% Modulus MPa | Melt Inedx, I$_2$ (dg/min) | Overall density (g/cc) |
|---|---|---|---|---|---|---|---|
| Ex. 20 | 62 | 38 | 58.2 | 81 | 3.91 | 0.9 | 0.884 |
| Ex. 21 | 60 | 40 | 53.6 | 84 | 4.62 | 0.9 | 0.888 |
| Comp. Ex. L | 79 | 21 | 58.4 | 60 | 1.41 | 1.0 | 0.872 |
| Comp. Ex. M | 82 | 18 | 51.7 | 62 | 1.7 | 1.1 | 0.872 |

Blocking Test

A specific blocking test is conducted on Examples 20-21 and Comparative Examples L-M to assess their anti-massing behaviors. The blocking test is performed according to the following procedure to measure the strength of pellet mass that has been consolidated at a known stress level and temperature for a pre-determined duration. A cylinder with two-inch diameter made up of two halves held together by a hose clamp is used. The internal surface of the cylinder is coated with calcium stearate. Excess calcium stearate dust is removed using an airbrush. An amount of 60-150 grams of sample of the pellets is poured into the cylinder. The side walls of the cylinder are tapped gently during loading to settle the solids. A two-inch TEFLON® circular sheet is placed on top of the solids in the cylinder to prevent sticking to the weight load. Test loads, temperature, and test duration are set to simulate relatively harsh transportation or storage conditions. A weight load is placed on the sheet and the cylinder is placed in an oven at 37° C. for a prescribed interval. A six-pound load is used to simulate a pressure of 275 lbf/ft$^2$. After the test interval, the load is then removed and the cylinder is allowed to cool at ambient conditions for at least 12 hours. The sample is then removed from the cylinder. The unconfined yield strength is measured using an INSTRON® tensile testing machine in compression mode.

The blocking test results for Examples 20-21 and Comparative Examples L-M are shown below in Table 27.

TABLE 27

| Example | 4 weeks, 37° C. | | 8 weeks, 37° C. |
|---|---|---|---|
| | Average force (lb/ft²) | Visual Observations | Average force (lb/ft²) |
| Ex. 20 | 0 | totally free flowing | 0 |
| Ex. 21 | 0 | totally free flowing, non-tacky | 0 |
| Comp. Ex. L | 2.519 | slightly tacky, held form | 4.58 |
| Comp. Ex. M | 2.1526 | slightly tacky, held form | 5.038 |

As shown in Table 27, Examples 20-21 showed free flowing pellet behavior without the need of force to separate them. No partitioning agent is used.

Examples 22-23 and Comparative Examples N-O

Examples 22-23 and Comparative Examples N-O are made according to formulations listed in Table 28 below. The INNOVENE® H352-02 is a polypropylene homopolymer with 35 melt flow high isotactic content. Examples 20-21 and Comparative Examples L-M are used as impact modifying polymers. The weight percents for the polymers are adjusted so that the volume ratio of polypropylene to the impact modifying polymer of each of Examples 22-23 and Comparative Examples N-O remains at about 65:35. The JETFILL® 700 C is a compacted talc of fine particles. The IRGANOX® B-225 is a blend of phenolic primary antioxidant and phosphate secondary antioxidant (1:1 ratio). Examples 22-23 and Comparative Examples N-O are prepared according to the following steps. A COPERION® ZSK-25 twin screw extruder with a thermoplastic olefin/talc screw design is used to compound the ingredients. The polypropylene and other blend components are fed into the extruder using individual loss/weight feeders. Talc is fed through a side arm feeder which is introduced into the third zone of the extruder barrel. A vacuum of about 18-20 inches of mercury is used in the extruder following talc mixing. Examples 22-23 and Comparative Examples N-O are injection molded into a Family ASTM die using an ARBURG™ 370 C 80-ton injection molder (obtainable from Arburg Incorporation, Lossburg, Germany).

TABLE 28

| Ingredient (wt. %) | Comp. Ex. N | Ex. 22 | Ex. 23 | Comp. Ex. O |
|---|---|---|---|---|
| INNOVENE™ H352-02 | 52.37 | 52.18 | 52.14 | 52.37 |
| Comparative Example L | 27.63 | 0 | 0 | 0 |
| Example 20 | 0 | 27.82 | 0 | 0 |
| Example 21 | 0 | 0 | 27.86 | 0 |
| Comparative Example M | 0 | 0 | 0 | 27.63 |
| JETFILL® 700C | 20 | 20 | 20 | 20 |
| IRGAFOS™ B225 | 0.2 | 0.2 | 0.2 | 0.2 |

Instrumented Dart Impact Test

Examples 22-23 and Comparative Examples N-O are conditioned in the lab at room temperature for at least seven days before testing. The specimens of each of Examples 22-23 and Comparative Examples N-O are sized into three inches of diameter and 0.125 inches of thickness. Ten specimens are tested for each Example. The instrumented dart impact test is run according to ASTM D3763. The instrumented dart impact results are shown in Table 29 below.

TABLE 29

| Example | Instrumented Dart Impact −30° C., Total Energy, ft-lbs. | Instrumented Dart Impact −30° C., % Ductile. |
|---|---|---|
| Comp. Ex. N | 40.27 | 100 |
| Ex. 22 | 41.74 | 100 |
| Ex. 23 | 42.8 | 100 |
| Comp. Ex. O | 39.63 | 100 |

As can be seen in Table 29, all of the Examples 22-23 and Comparative Examples N-O demonstrate ductile impact behavior. In addition, Examples 22 and 23 containing Examples 20 and 21 respectively possess a desirable combination of low pellet blocking characteristics and good thermoplastic olefin impact efficiency.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

We claim:
1. An impact modified composition comprising:
A) a thermoplastic polymer composition; and
B) an impact-modifying amount of a multi-block ethylene/α-olefin interpolymer comprising hard segments and soft segments,
wherein the amount of the hard segments is at least 30 weight percent to 70 weight percent, based on the total weight of the multi-block ethylene/α-olefin interpolymer, the hard segments having greater than 95 weight percent units derived from ethylene, the soft segments having from 8 mole percent to 45 mole percent α-olefin content and wherein the multi-block ethylene/α-olefin interpolymer is polymerized in the presence of a chain shuttling agent and;
(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{ and either}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer and if less than 5 percent of the polymer has an identifiable CRYSTAF peak, then the CRYSTAF temperature is 30° C.; or (c) is characterized by and elastic recovery, Re, in percent at 300 percent strain and 1 cycle measured with a compression-molded film of the multi-block ethylene/α-olefin interpolymer, and has a density, d, in grams/cubic centimeter, wherein the numerical values of Re and d satisfy the following relationship when ethylene/α-olefin interpolymer is substantially free of a cross-linked phrase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the multi-block ethylene/α-olefin interpolymer; or (e) has at least one molecular fraction which elutes between 40° C. and 130° C. when fractionated using TREF, characterized in that the fraction has a block index of at least 0.5 and up to about 1; or (f) has an average block index greater than zero and up to about 1.0; or (g) has a storage modulus at 25° C., G'(25° C.), and a storage modulus at 100° C. G'(100° C.), wherein the ratio of G'(25° C.) to G'(100° C.) is in the range of about 1:1 to about 9:1.

2. The impact modified composition of claim 1, wherein the amount of the hard segment is from about 35 weight percent to about 70 weight percent, based on the total weight of the multi-block ethylene/αolefin interpolymer.

3. The impact modified composition of claim 1, wherein the amount of the α-olefin monomer in the soft segment of the multi-block ethylene/α-olefin interpolymer is from about 12 mole percent to about 35 mole percent, based on the total amount of the α-olefin monomer and the ethylene monomer in the soft segment in mole.

4. The impact modified composition of claim 1, wherein the thermoplastic polymer composition comprises one or more polymers selected from the group consisting of polyurethanes, polyvinyl chlorides, styrenics, hydrogenated styrenics, polynorbornene, polyethylene-co-norbornene, poly-4-methyl-pentene with one or more pre-grafted functional monomers, polyolefins, polycarbonates, thermoplastic polyester, polyamides, polyacetals, and polysulfones.

5. The impact modified composition of claim 1, wherein the multi-block ethylene/α-olefin interpolymer has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.

6. The impact modified composition of claim 1, wherein the multi-block ethylene/α-olefin interpolymer is characterized by an elastic recovery, Re, in percent at 300 percent strain and 1 cycle measured with a compression-molded film of the multi-block ethylene/α-olefin interpolymer, and has a density, d, in grams/cubic centimeter, wherein the numerical values of Re and d satisfy the following relationship when ethylene/α-olefin interpolymer is substantially free of a cross-linked phase: Re>1481-1629(d).

7. The impact modified composition of claim 1, wherein the multi-block ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the multi-block ethylene/α-olefin interpolymer.

8. The impact modified composition of claim 1, wherein the multi-block ethylene/α-olefin interpolymer has at least one molecular fraction which elutes between 40° C. and 130° C. when fractionated using TREF, characterized in that the fraction has a block index of at least 0.5 and up to about 1.

9. The impact modified composition of claim 1, wherein the multi-block ethylene/α-olefin interpolymer has an average block index greater than zero and up to about 1.0.

10. The impact modified composition of claim 1, wherein the multi-block ethylene/α-olefin interpolymer has a storage modulus at 25° C., G'(25° C.), and a storage modulus at 100° C., G'(100° C.), wherein the ratio of G'(25° C.) to G'(100° C.) is in the range of about 1:1 to about 9:1.

11. A fabricated article comprising the impact modified composition of claim 1.

12. An impact modified composition comprising:
A) a propylene polymer; and
B) an impact-modifying amount of a multi-block ethylene/α-olefin interpolymer comprising hard segments and soft segments,
wherein the amount of the hard segments is at least 30 weight percent to 70 weight percent, based on the total weight of the multi-block ethylene/α-olefin interpolymer, the hard segments having greater than 95 weight percent units derived from ethylene, the soft segments having from 8 mole percent to 45 mole percent α-olefin content and wherein the multi-block ethylene/α-olefin interpolymer is polymerized in the presence of a chain shuttering agent and
has a Mw/Mn from about 1.7 to about 3.5, at least one melting point, Tm, in degrees Celsius, and density, d, in grams/cubic centimeter, wherein the numerical values of Tm and d correspond to the relationship:

$$T_m > -2002.9 + 4538.5(d) - 2422.2(d)^2; \text{ and}$$

wherein the multi-block ethylene/α-olefin interpolymer has an average block index greater than zero and up to about 1.0.

13. The impact modified composition of claim 12, wherein the amount of the hard segment is from about 35 weight percent to about 70 weight percent, based on the total weight of the multi-block ethylene/α-olefin interpolymer.

14. The impact modified composition of claim 12, wherein the amount of the α-olefin monomer in the soft segment of the multi-block ethylene/α-olefin interpolymer is from about 12 mole percent to about 35 mole percent, based on the total amount of the α-olefin monomer and the ethylene monomer in the soft segment in mole.

15. The impact modified composition of claim 12 further comprising at least one additive selected from the group consisting of slip agents, anti-blocking agents, cling additives, plasticizers, oils, waxes, antioxidants, UV stabilizers, colorants or pigments, fillers, flow aids, coupling agents, crosslinking agents, surfactants, solvents, lubricants, antifogging agents, nucleating agents, flame retardants, antistatic agents and combinations thereof.

16. An impact modified composition comprising:
A) a high density polyethylene; and
B) an impact-modifying amount of a multi-block ethylene/α-olefin interpolymer comprising hard segments and soft segments,
wherein the amount of the hard segments is at least 30 weight percent to 70 weight percent, based on the total weight of the multi-block ethylene/α-olefin interpolymer, the soft segments having from 8 mole percent to 45 mole percent α-olefin content, and the multi-block ethylene/α-olefin interpolymer is polymerized in the presence of a chain shuttling agent, and
has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{ and}$$

wherein the multi-block ethylene/α-olefin interpolymer has an average block index greater than zero and up to about 1.0.

17. The impact modified composition of claim 16, wherein the amount of hard segment is from about 35 weight percent to about 70 weight percent, based on the total weight of the multi-block ethylene/α-olefin interpolymer.

18. The impact modified composition of claim 16, wherein the amount of the α-olefin monomer in the soft segment of the multi-block ethylene/α-olefin interpolymer is from about 12 mole percent to about 35 mole percent, based on the total amount of the α-olefin monomer and the ethylene monomer in the soft segment in mole.

19. The impact modified composition of claim 16 further comprising at least one additive selected from the group consisting of slip agents, anti-blocking agents, cling additives, plasticizers, oils, waxes, antioxidants, UV stabilizers, colorants or pigments, fillers, flow aids, coupling agents, crosslinking agents, surfactants, solvents, lubricants, antifogging agents, nucleating agents, flame retardants, antistatic agents and combinations thereof.

* * * * *